(12) United States Patent
Laude et al.

(10) Patent No.: US 10,148,971 B2
(45) Date of Patent: Dec. 4, 2018

(54) INTER-LAYER PREDICTION FOR SCALABLE VIDEO CODING

(71) Applicant: VID SCALE, INC., Wilmington, DE (US)

(72) Inventors: Thorsten Laude, Hannover (DE); Xiaoyu Xiu, San Diego, CA (US); Jie Dong, San Diego, CA (US); Yan Ye, San Diego, CA (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 20 days.

(21) Appl. No.: 15/024,341

(22) PCT Filed: Sep. 24, 2014

(86) PCT No.: PCT/US2014/057285
§ 371 (c)(1),
(2) Date: Mar. 23, 2016

(87) PCT Pub. No.: WO2015/048176
PCT Pub. Date: Apr. 2, 2015

(65) Prior Publication Data
US 2016/0212436 A1 Jul. 21, 2016

Related U.S. Application Data

(60) Provisional application No. 61/881,801, filed on Sep. 24, 2013.

(51) Int. Cl.
*H04N 19/00* (2014.01)
*H04N 19/33* (2014.01)
(Continued)

(52) U.S. Cl.
CPC .......... *H04N 19/33* (2014.11); *H04N 19/107* (2014.11); *H04N 19/117* (2014.11);
(Continued)

(58) Field of Classification Search
CPC ..... H04N 19/139; H04N 19/52; H04N 19/503
(Continued)

(56) References Cited

U.S. PATENT DOCUMENTS

| 5,436,665 A | 7/1995 | Ueno et al. |
| 2004/0032908 A1* | 2/2004 | Hagai ................. H04N 19/159 375/240.25 |

(Continued)

FOREIGN PATENT DOCUMENTS

| EP | 0644695 A2 | 3/1995 |
| JP | 5-308631 A | 11/1993 |

(Continued)

OTHER PUBLICATIONS

JP 5-308631 A, Cited in Office Action dated May 9, 2017, issued in related Japanese Patent Application No. 2016-516968.
(Continued)

*Primary Examiner* — Jeffery A Williams
(74) *Attorney, Agent, or Firm* — Condo Roccia Koptiw LLP

(57) ABSTRACT

Systems, methods, and instrumentalities are disclosed for increasing the efficiency of inter-layer prediction using an enhanced inter-layer reference (EILR) picture as a reference picture for inter-layer prediction for encoding an enhancement layer. A luminance component and chrominance components of an inter-layer reference (ILR) picture may be enhanced. High frequency information may be obtained by processing an inter-layer motion compensated (ILMC) picture with a high pass filter. Low frequency information may be obtained by processing an ILR picture with a low pass
(Continued)

filter. The EILR picture may be generated as a function of the high frequency information, the low frequency information, and/or the ILR picture.

28 Claims, 19 Drawing Sheets

(51) Int. Cl.
| | | |
|---|---|---|
| H04N 19/117 | (2014.01) | |
| H04N 19/463 | (2014.01) | |
| H04N 19/107 | (2014.01) | |
| H04N 19/139 | (2014.01) | |
| H04N 19/186 | (2014.01) | |
| H04N 19/52 | (2014.01) | |
| H04N 19/593 | (2014.01) | |
| H04N 19/503 | (2014.01) | |

(52) U.S. Cl.
CPC ......... *H04N 19/139* (2014.11); *H04N 19/186* (2014.11); *H04N 19/463* (2014.11); *H04N 19/52* (2014.11); *H04N 19/593* (2014.11); *H04N 19/503* (2014.11)

(58) Field of Classification Search
USPC ..................................................... 375/240.16
See application file for complete search history.

(56) References Cited

U.S. PATENT DOCUMENTS

| | | | |
|---|---|---|---|
| 2006/0215762 | A1 | 9/2006 | Han et al. |
| 2007/0091997 | A1 | 4/2007 | Fogg et al. |
| 2007/0140350 | A1* | 6/2007 | Sakazume ............... H04N 19/29 375/240.21 |
| 2007/0147709 | A1 | 6/2007 | Lee et al. |
| 2011/0069752 | A1 | 3/2011 | Watanabe et al. |
| 2011/0286526 | A1 | 11/2011 | Nakagami et al. |
| 2012/0170646 | A1* | 7/2012 | Baylon ................ H04N 19/619 375/240.02 |
| 2015/0010083 | A1* | 1/2015 | Lee ...................... H04N 19/105 375/240.16 |
| 2015/0195566 | A1* | 7/2015 | Hinz .................... H04N 19/105 375/240.13 |

FOREIGN PATENT DOCUMENTS

| | | | |
|---|---|---|---|
| JP | 7-162870 A | 6/1995 | |
| JP | 11-331613 A | 11/1999 | |
| JP | 2007-28034 A | 2/2007 | |
| JP | 2008-517498 A | 5/2008 | |
| JP | 2008-535310 A | 8/2008 | |
| JP | 2015-536104 A | 12/2015 | |
| KR | 10-0728921 B1 | 6/2007 | |
| WO | WO 2009/133844 A1 | 11/2009 | |
| WO | WO 2010/095556 A1 | 8/2010 | |
| WO | WO 2014/053512 A1 | 4/2014 | |
| WO | WO 2014/053514 A1 | 4/2014 | |

OTHER PUBLICATIONS

JP 11-331613 A, Cited in Office Action dated May 9, 2017, issued in related Japanese Patent Application No. 2016-516968.
JP 2007-28034 A, Cited in Office Action dated May 9, 2017, issued in related Japanese Patent Application No. 2016-516968.
JP 2008-517498 A, Cited in Office Action dated May 9, 2017, issued in related Japanese Patent Application No. 2016-516968.
Bross et al., "High Efficiency Video Coding (HEVC) Text Specification Draft 10 (for FDIS & Consent)", Document: JCTVC-L1003_v1, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.
Chen et al., "SHVC Test Model 2 (SHM 2)", Document: JCTVC-M1007_v1, Joint Collaborative Team on Video Coding (JCT-VC) of ITU-T SG16 WP3 and ISO/IEC JTC1/SC29/WG11, 13th Meeting: Incheon, KR, Apr. 18-26, 2013, 45 pages.
Chen et al., "SHVC Working Draft 2", Document: JCTVC-M1008_v1, Joint Collaborative Team on Video Coding (JCT-VC) of ITU-T SG16 WP3 and ISO/IEC JTC1/SC29/WG11, 13th Meeting: Incheon, KR, Apr. 18-26, 2013, 53 pages.
ITU-T, "Advanced Video Coding for Generic Audiovisual Services", Series H: Audiovisual And Multimedia Systems; Infrastructure of Audiovisual Services—Coding of Moving Video Advanced, ITU-T Rec H.264 and ISO/IEC/MPEG 4 part 10, Nov. 2007, 563 pages.
Tourapis et al., "H.264/14496-10 AVC Reference Software Manual", Document: JVT-AE010, Joint Video Team (JVT) of ISO/IEC MPEG & ITU-T VCEG (ISO/IEC JCT1/SC29/WG11 and ITU-T SG16 Q.6), $31^{ST}$ Meeting: London, UK Jun. 28-Jul. 3, 2009, 90 pages.
Li et al., "Common SHM Test Conditions and Software Reference Configurations" Document:JCTVC_M1009_r1, Joint Collaborative Team on Video Coding (JCT-VC) of ITU-T SG16 WP3 and ISO/IEC JTC1/SC29/WG11, 13th Meeting: Incheon, KR, Apr. 18-26, 2013, 5 pages.
Luthra et al., "Requirements of the Scalable Enhancement of HEVC", WG11 Requirements and Video, ISO/IEC JTC1/SC29/WG11 N12956, Stockholm, Sweden, Jul. 2012, 12 pages.
Luthra et al., "Use cases for the Scalable Enhancement of HEVC", WG11 AHG on Study of HEVC Extensions, ISO/IEC JTC1/SC29/WG11 M24483, Geneva, Switzerland, Apr. 2012, 8 pages.
SMPTE, "VC-1 Compressed Video Bitstream Format and Decoding Process", SMPTE 421M-2006, Feb. 24, 2006, 493 pages.
Sullivan et al., "Rate-Distortion Optimization for Video Compression", Signal Processing Magazine, IEEE, vol. 15, No. 6, Nov. 1998, pp. 74-90.
Chen et al., "Scalable Video Coding Extension for HEVC", 2013 IEEE Data Compression Conference, Mar. 2013, 10 pages.
Guo et al., "SCE4.2.3: Inter-Layer Adaptive Filter on Reconstructed Base Layer Pixels", JCTVC-M0195, 13th Meeting, Incheon, Korea, Apr. 18-26, 2013, pp. 1-6.
He et al., "ILR Enhancement with Differential Coding for SHVC Reference Index Framework", JCTVC-N0204, 14th Meeting, Vienna, AT, Jul. 25-Aug. 2, 2013, pp. 1-6.
Helle et al., "Scalable Video Coding Extension for HEVC", 2013 IEEE Data Compression Conference, Mar. 2013, 10 pages.
Lange et al., "Simple AVC-Based Codecs with Spatial Scalability", International Conference on Image Processing (ICIP), Oct. 24, 2004, 4 pages.
Schwarz et al., "Description of Scalable Video Coding Technology Proposal by Fraunhofer HHI (Configuration B)", JCTVC-K0043, 11th Meeting: Shanghai, CN, Oct. 10-19, 2012, 36 pages.
Wiegand et al., "Overview of the H.264/AVC Video Coding Standard", IEEE Transactions on Circuits and Systems for Video Technology, vol. 13, No. 7, Jul. 2003, pp. 560-576.
Zhang et al., "Subband Motion Compensation for Spatially Scalable Video Coding", Proceedings of SPIE, Jan. 28, 2007, 11 pages.

* cited by examiner

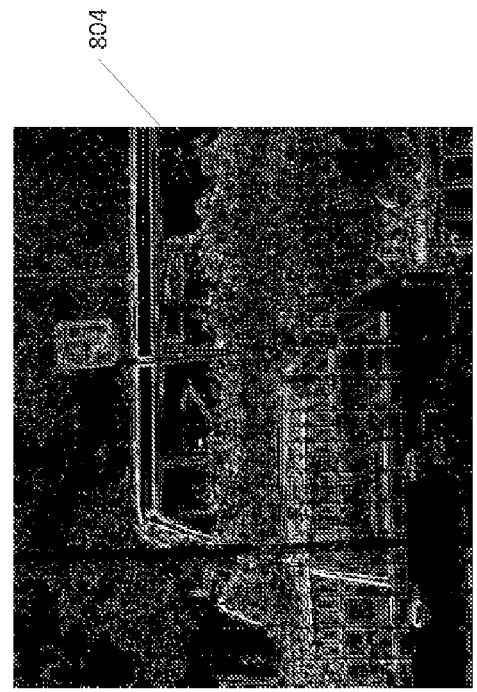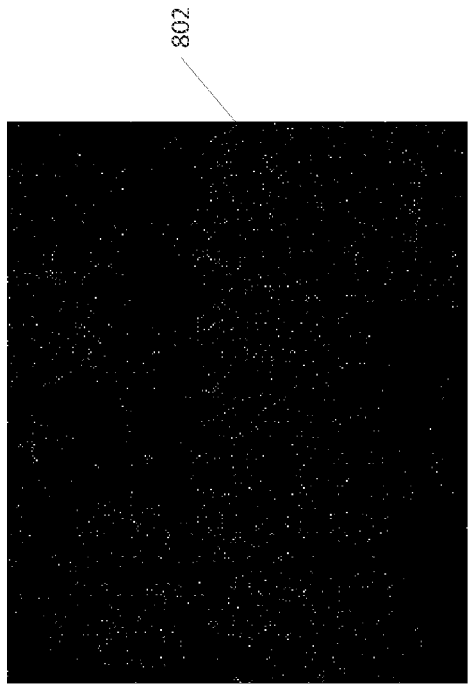
FIG. 8A
FIG. 8C
FIG. 8B

INTER-LAYER PREDICTION FOR SCALABLE VIDEO CODING

CROSS-REFERENCE TO RELATED APPLICATION

This application is the National Stage Entry under 35 U.S.C. § 371 of Patent Cooperation Treaty Application No. PCT/US2014/057285, filed Sep. 24, 2014, which claims the benefit of U.S. Provisional Patent Application No. 61/881,801, filed Sep. 24, 2013, the disclosure of which is hereby incorporated herein in its entirety.

BACKGROUND

Video coding systems may be used to compress digital video signals to reduce the storage resources used and/or transmission bandwidth of such signals. Among the various types of video coding systems, such as block-based, wavelet-based, and/or object-based systems, block-based hybrid video coding systems may be commonly used and deployed. Examples of block-based video coding systems may include international video coding standards, such as the MPEG 1/2/4 part 2, H.264/MPEG-4 part 10 AVC, and VC-1 standards. High Efficiency Video Coding (HEVC) standards may also follow the block-based hybrid video coding framework.

SUMMARY

Systems, methods, and instrumentalities are disclosed for increasing the efficiency of inter-layer prediction using an enhanced inter-layer reference (EILR) picture as a reference picture for inter-layer prediction of an enhancement layer picture. A luminance component and/or a chrominance component of an inter-layer reference (ILR) picture may be enhanced. High frequency information may be obtained by processing an inter-layer motion compensated (ILMC) picture with a high pass filter. Low frequency information may be obtained by processing an ILR picture with a low pass filter. The EILR picture may be generated as a function of the high frequency information, the low frequency information, and/or the ILR picture.

A video coding method may comprise receiving a first reference picture and a second reference picture. The first reference picture may be processed with a high pass filter to generate high frequency information. The second reference picture may be processed with a low pass filter to generate low frequency information. A predictor may be generated as a function of a linear combination of the high frequency information and the low frequency information.

BRIEF DESCRIPTION OF THE DRAWINGS

FIGS. 8A-8C are pictures illustrating an example distortion between an original enhancement layer picture and temporal reference and inter-layer reference (ILR) pictures.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
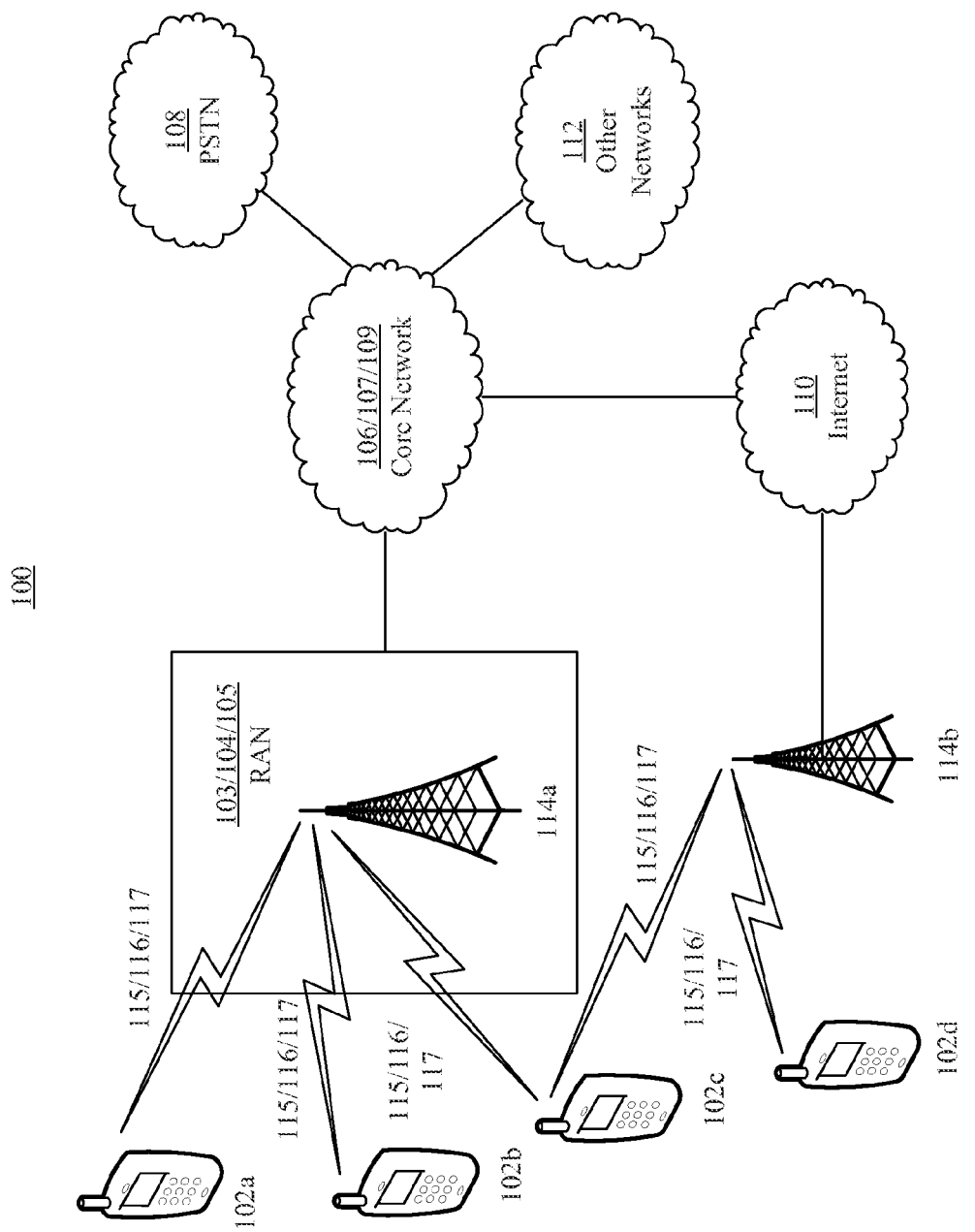
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a. 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c. 102d may utilize a cellular-based RAT (e.g., WCDMA, CDMA2000. GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a. 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
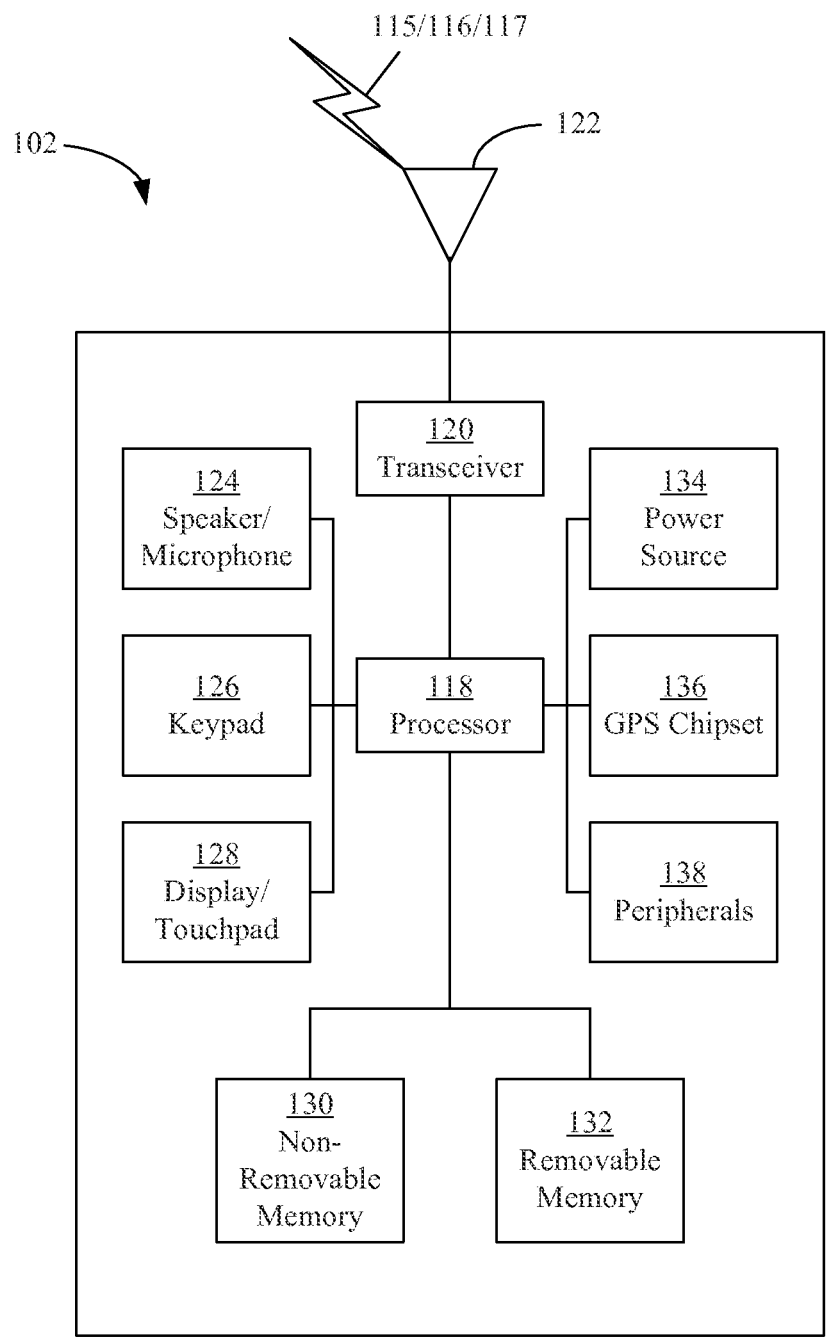
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
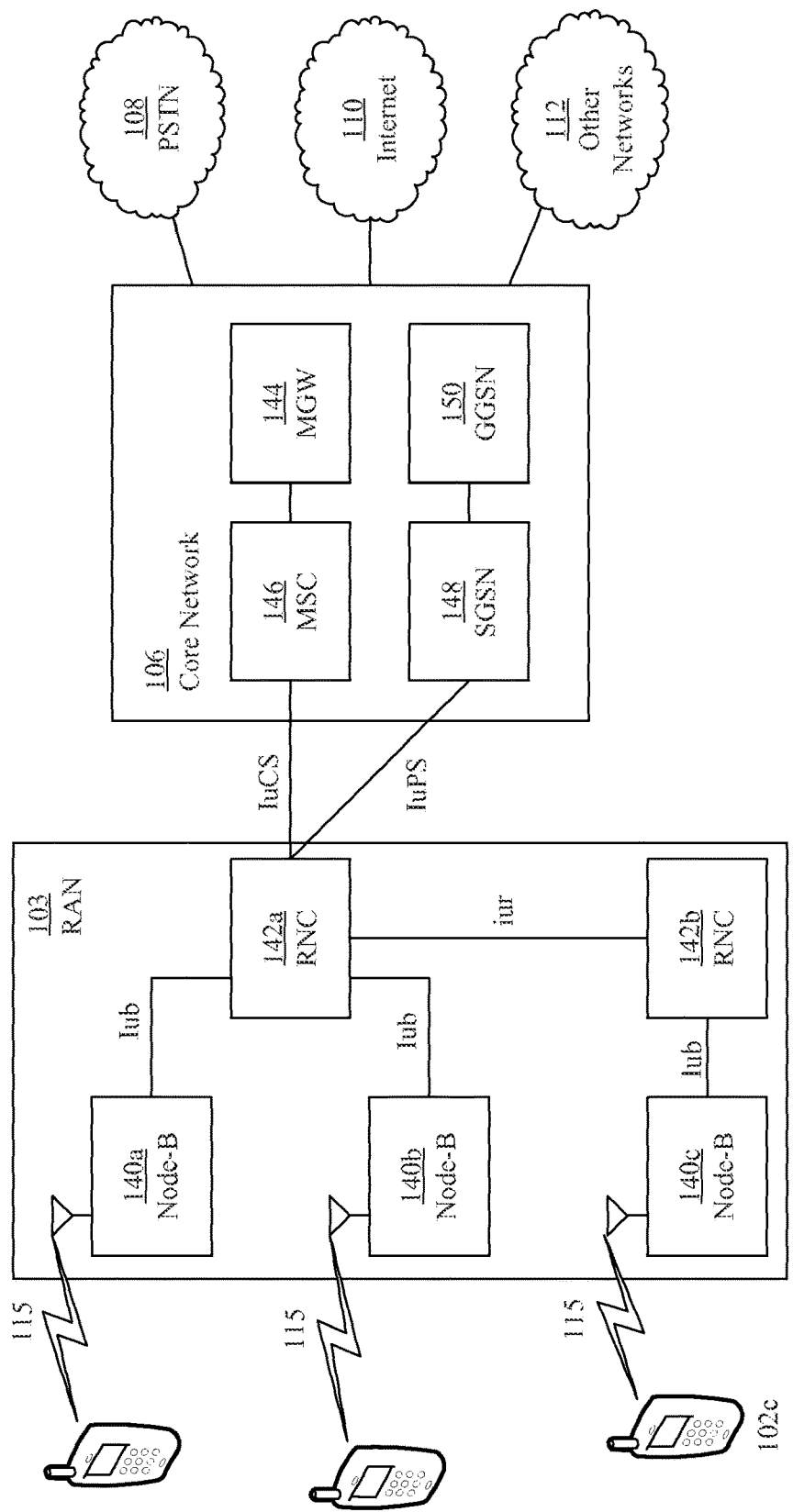
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
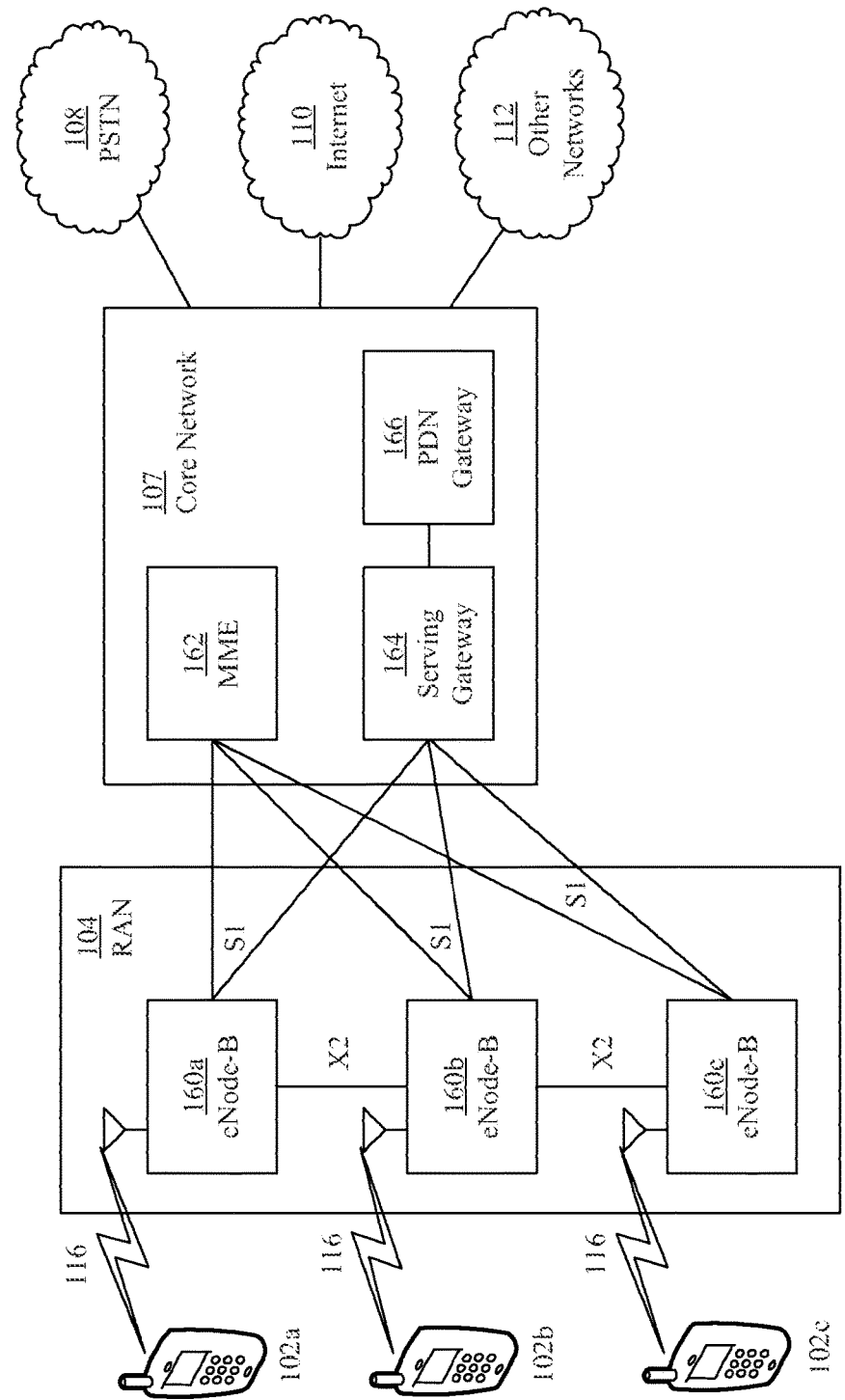
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a. 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
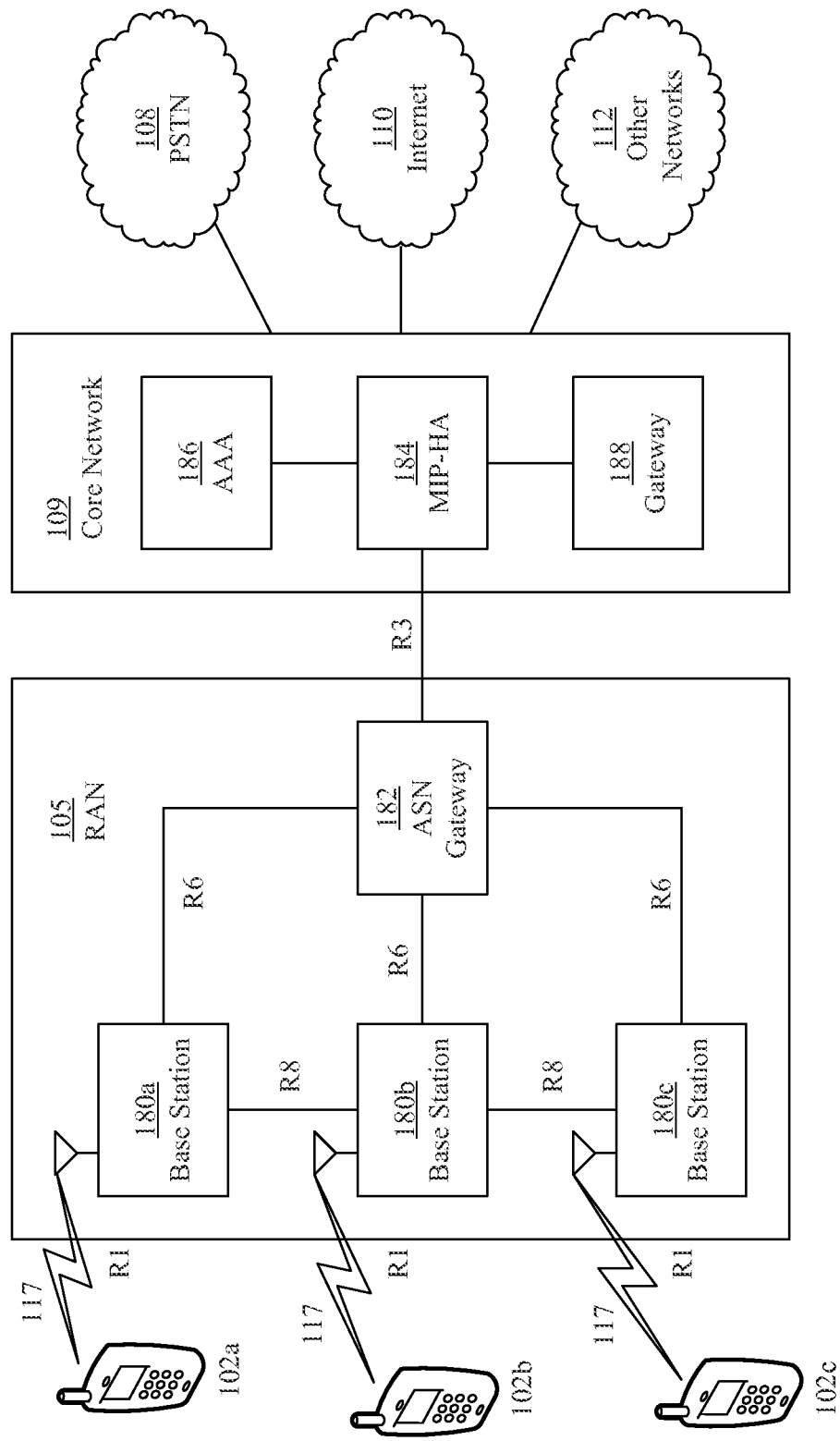
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b. 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

According to the disclosed subject matter, the efficiency of inter-layer prediction may be increased by using an enhanced inter-layer reference (EILR) picture as a reference picture for inter-layer prediction of an enhancement layer picture. A luminance component and/or a chrominance component of an inter-layer reference (ILR) picture may be enhanced. High frequency information may be obtained by processing an inter-layer motion compensated (ILMC) picture with a high pass filter. Low frequency information may be obtained by processing an ILR picture with a low pass filter. The EILR picture may be generated as a function of the high frequency information, the low frequency information, and/or the ILR picture.

Figure 2:
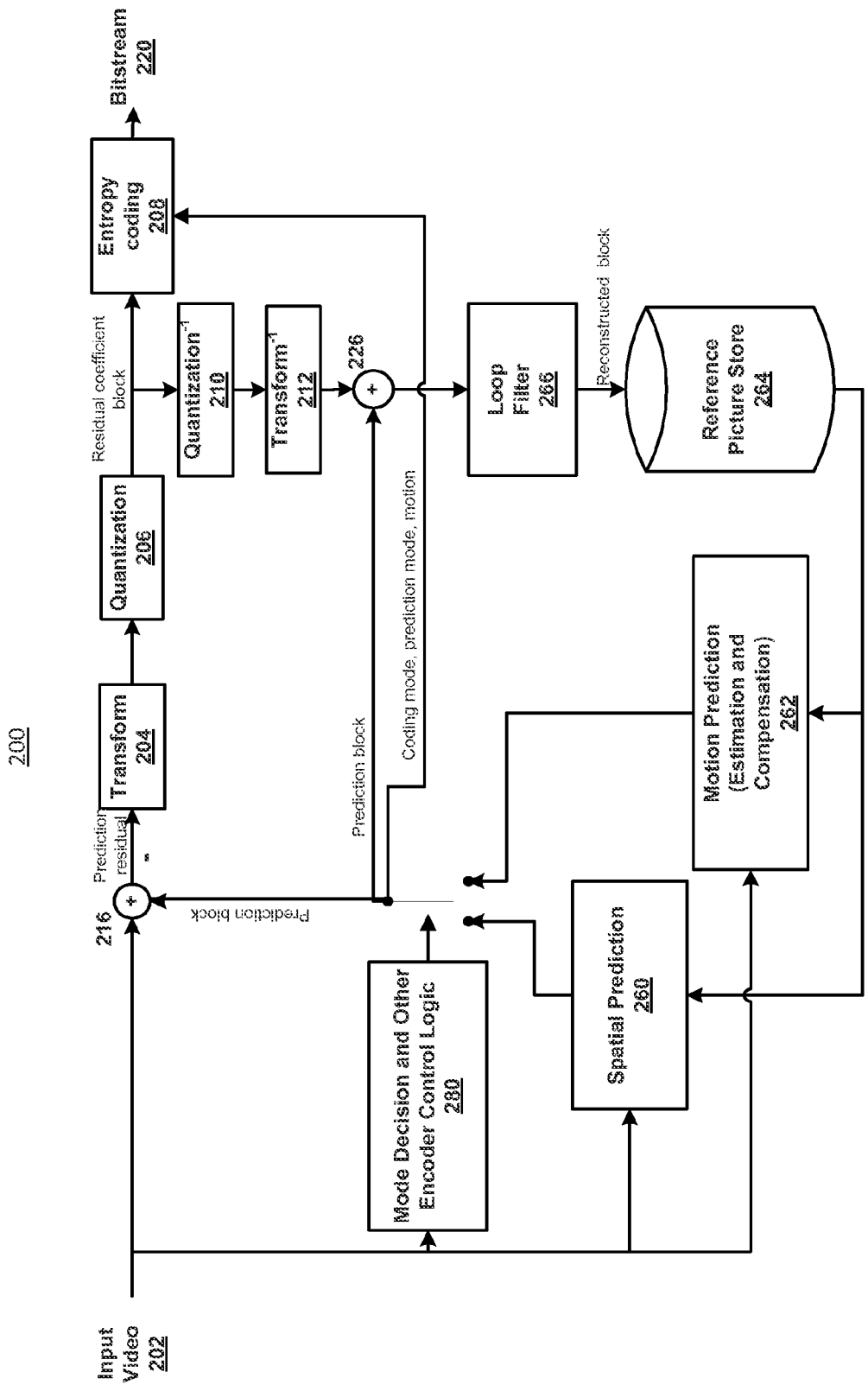
FIG. 2 is a block diagram illustrating an example video encoding system.

FIG. 2 illustrates an example block-based hybrid video encoding system 200. An input video signal 202 may be processed block by block. A video block unit may consist of 16×16 pixels. Such a block unit may also be commonly referred to as a macroblock or MB. In HEVC, extended block sizes, known as a coding unit or CU, may be used to efficiently compress high resolution video signals, e.g., having a resolution of 1080p or higher. A CU may be square and may have flexible size. The largest size can be set on a sequence basis and may be, for example, 64×64 pixels. A CU can be further partitioned into prediction units or PU, for which separate prediction methods are applied. For an input video block (MB or CU), spatial prediction and/or temporal prediction may be performed at 260 and 262, respectively. Spatial prediction (e.g., or intra prediction) may use pixels from the already coded neighboring blocks in the same video picture/slice to predict the current video block. Spatial prediction may reduce spatial redundancy inherent in the video signal. Temporal prediction (e.g., also referred to as inter prediction or motion compensated prediction) may use pixels from the already coded video pictures to predict the current video block. Temporal prediction may reduce temporal redundancy inherent in the video signal. A temporal prediction signal for a given video block may comprise one or more motion vectors and/or one or more reference picture indices, e.g., if multiple reference pictures are used. These reference picture indices may be included to identify from which reference pictures in a reference picture store 264 the temporal prediction signal may come. After spatial and/or temporal prediction, a mode decision block 280 in the encoder may choose a prediction mode, e.g., may choose the best prediction mode, for example based on a rate-distortion optimization method. The prediction block may be subtracted from the current video block at 216. The prediction residual may be transformed at 204 and/or may be quantized at 206. The quantized residual coefficients may be inverse quantized at 210 and/or inverse transformed at 212 to form the reconstructed residual, which may be added back to the prediction block at 226 to form the reconstructed video block. Further in-loop filtering, such as de-blocking filter and/or adaptive loop filters may be applied at 266 on the reconstructed video block before it is put in the reference picture store 264 and used to code future video blocks. To form an output video bitstream 220, a coding mode (inter or intra), prediction mode information, motion information, and/or quantized residual coefficients may be sent to an entropy coding unit 208 to be further compressed and packed to form the bitstream.

Figure 3:
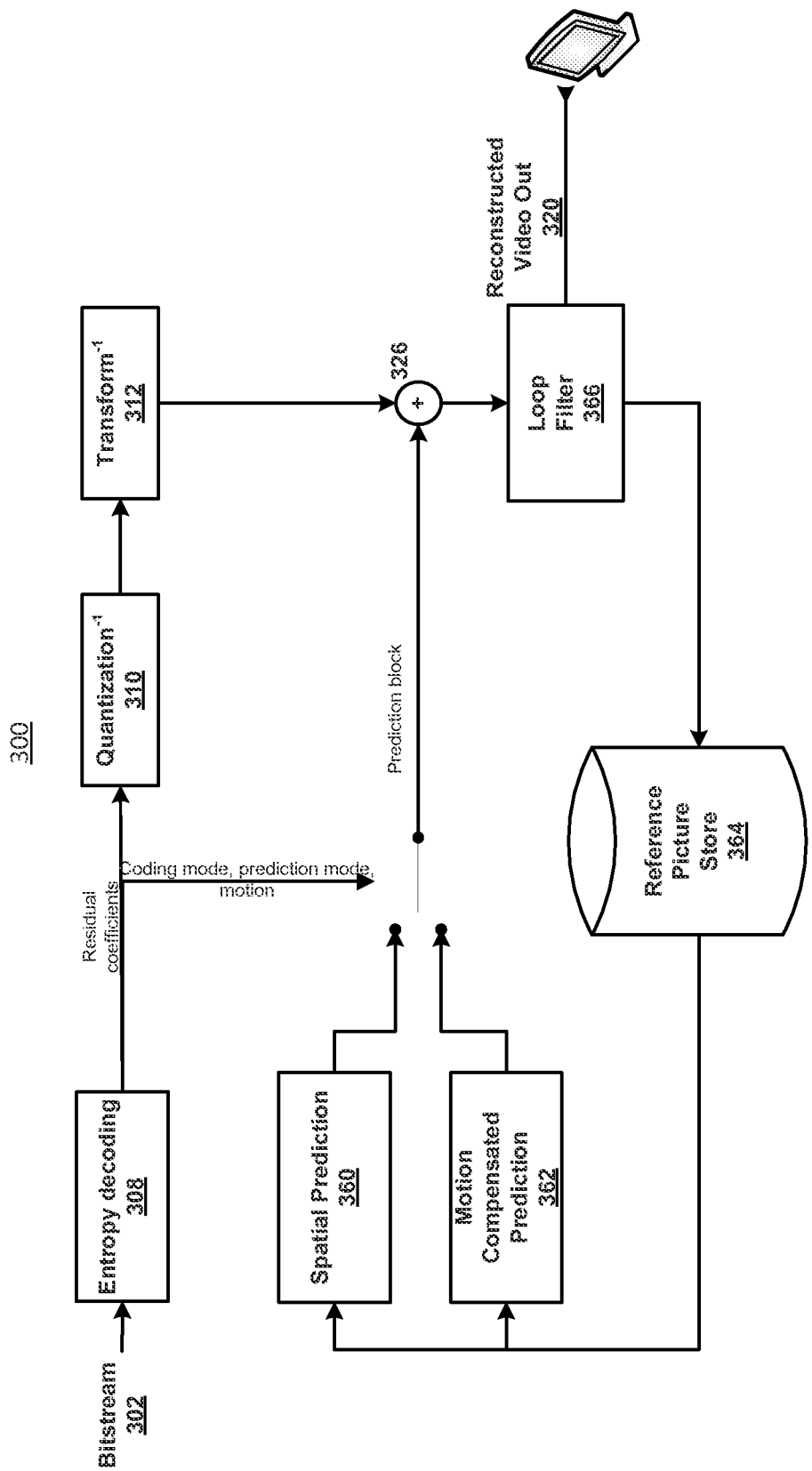
FIG. 3 is a block diagram illustrating an example video decoding system.

FIG. 3 gives a general block diagram of a block-based video decoder 300 that may correspond to the block-based hybrid video encoding system 200 of FIG. 2. A video bitstream 302 may be unpacked and entropy decoded at an entropy decoding unit 308. The coding mode and prediction information may be sent to either an spatial prediction unit 360 (if intra coded) or an temporal prediction unit 362 (if inter coded) to form the prediction block. The residual transform coefficients may be sent to an inverse quantization unit 310 and/or an inverse transform unit 312 to reconstruct the residual block. The prediction block and the residual block may be added together at 326. The reconstructed block may further go through in-loop filtering before it may be stored in a reference picture store 364. The reconstructed video in the reference picture store 364 may be sent out to drive a display device, as well as used to predict future video blocks.

Digital video services may refer to TV services over satellite, cable, and/or terrestrial broadcasting channels. However, as the Internet on mobile devices starts to become more established, especially with the recent growth of smartphones and tablets in resolution and computation capability, an increasing number of video applications, such as video chat, mobile video recording and sharing, and video streaming, may use video transmission in heterogeneous environments. The scenarios known as 3-screen and N-screen that consider various consumer devices (e.g., PCs, smart phones, tablets, TVs) may accommodate video consumption on devices with widely varying capabilities in terms of computing power, memory/storage size, display resolution, display frame rate, etc. Additionally, the network and transmission channels may also have widely varying characteristics in terms of packet loss rate, available channel bandwidth, burst error rate, etc. Moreover, video data may be transmitted over a combination of wired networks and wireless networks, further complicating the underlying transmission channel characteristics. In such scenarios, scalable video coding may provide an attractive solution to improve the quality of experience for video applications running on devices with different capabilities over heterogeneous networks. Scalable video coding may involve encoding the signal once at a highest representation (temporal resolution, spatial resolution, quality, etc.). Decoding from subsets of the video streams may be enabled depending on the specific rate and representation used by certain applications that may be running on a specific client device. Scalable video coding can save bandwidth and storage compared to non-scalable solutions. The international video standards MPEG-2 Video, H.263, MPEG4 Visual and H.264 have tools and/or profiles that support some modes of scalability. HEVC may include scalable extensions known as SHVC.

Figure 4:
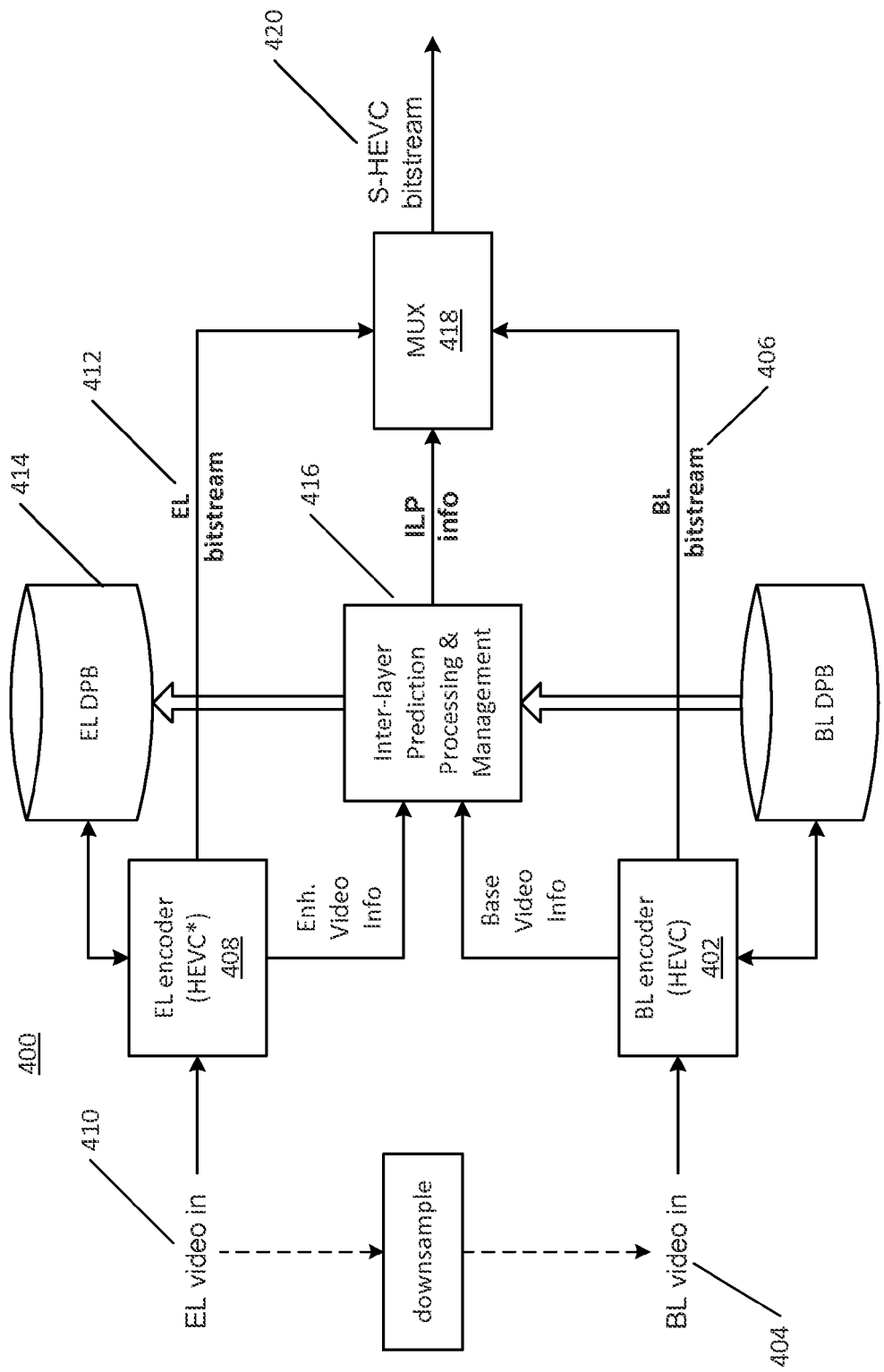
FIG. 4 is a block diagram illustrating an example scalable video encoding system.

FIG. 4 illustrates an example scalable video encoding system 400. A two-layer scalable coding system may comprise a base layer and an enhancement layer. The spatial resolutions between the two layers may be different, e.g., spatial scalability may be applied. A base layer encoder 402, e.g., an HEVC encoder, may encode a base layer video input 404 block by block and may generate a base layer bitstream 406, e.g., according to the example shown in FIG. 2. An enhancement layer encoder 408 may encode an enhancement layer video input 410 block by block and may generate an enhancement layer bitstream 412, e.g., according to the example shown in FIG. 2. To improve the coding efficiency of the scalable system, when the enhancement layer video input 410 is encoded, signal correlation from the base layer reconstructed video may be used to improve its prediction accuracy. For example, the base layer reconstructed video may be processed and at least some of the processed base layer pictures may be inserted into an enhancement layer DPB 414 and may be used to predict the enhancement layer video input. In the example shown in FIG. 4, the base layer video input 404 and the enhancement layer video input 410 may be essentially the same video source represented in different spatial resolutions. They may correspond to each other via the downsampling process. An inter-layer processing and management subsystem 416 may perform, as part of inter-layer prediction processing, an upsampling operation used to align the spatial resolution of the base layer reconstruction with that of the enhancement layer video. In addition to the base layer bitstream 406 and the enhancement layer bitstream 412 produced by the base layer encoder 402 and the enhancement layer encoder 408, respectively, certain inter-layer prediction information may also be produced by the ILP processing and management subsystem 416. For example, the ILP information may comprise the type of inter-layer processing being applied, the parameters are used in the processing (e.g., the upsampling filters used), which of the one or more processed base layer pictures should be inserted into the enhancement layer DPB, and/or the like. The base and enhancement layer bitstreams and the ILP information may be multiplexed together, e.g., by a multiplexer 418, to form a scalable bitstream 420.

Figure 5:
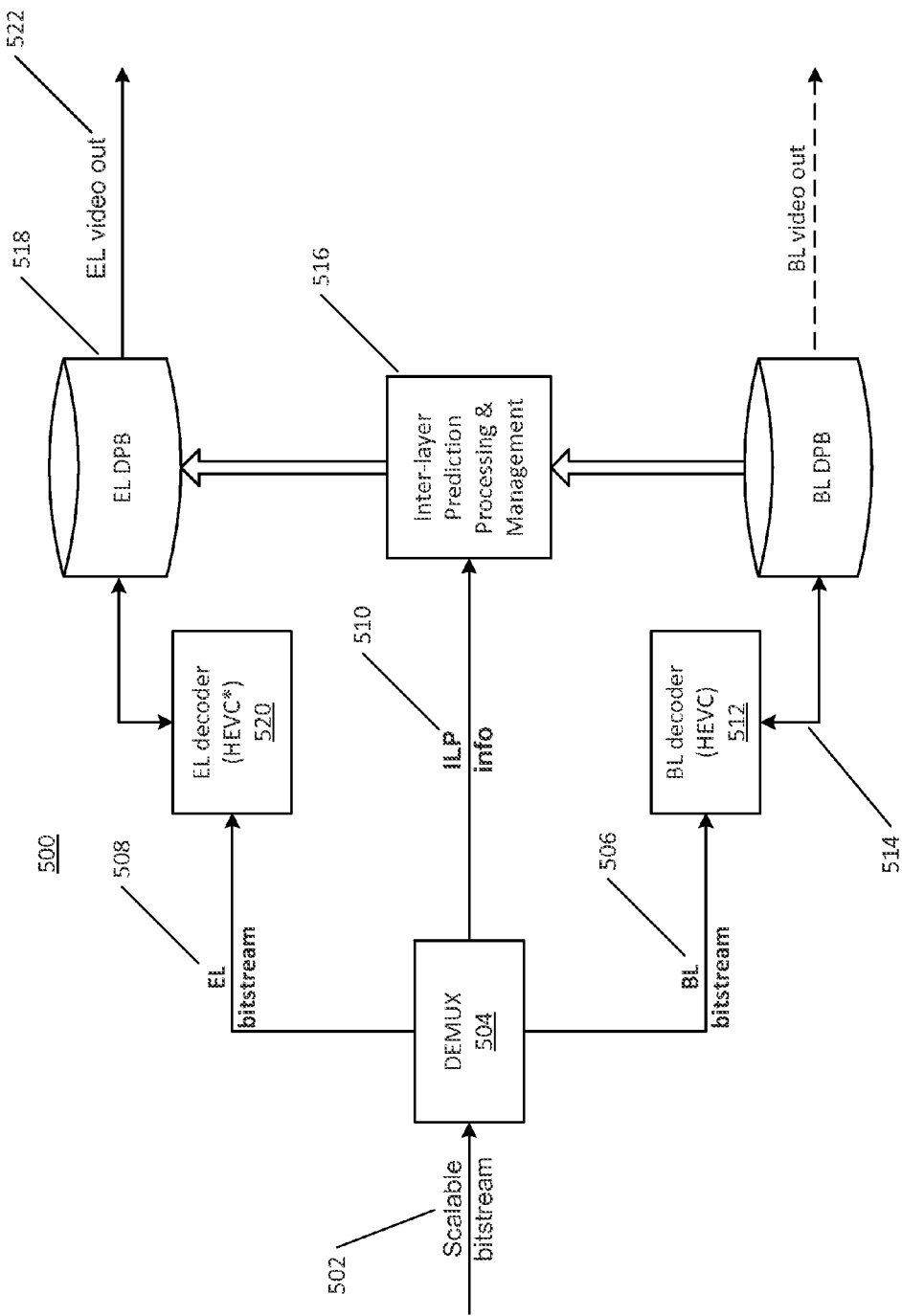
FIG. 5 is a block diagram illustrating an example two-layer scalable video decoding system.

FIG. 5 illustrates a two-layer scalable video decoder 500 that may correspond to the scalable encoder 400 of FIG. 4. The decoder 500 may perform corresponding operations in a reverse order relative to the encoder 400. A scalable bitstream 502 is first demultiplexed, e.g., by a demultiplexer 504 into a base layer bitstream 506, an enhancement layer bitstream 508, and ILP information 510. A base layer decoder 512 may decode the base layer bitstream 506 and may produce a base layer reconstruction 514. An ILP processing and management subsystem 516 may receive the ILP information 510 and may process the base layer reconstruction 514 in accordance with the received ILP information 510. The ILP processing and management subsystem 516 may selectively insert one or more of the processed base layer pictures into an enhancement layer DPB 518, also in accordance with the received ILP information 510. An enhancement layer decoder 520 may decode the enhancement layer bitstream 508 with a combination of temporal reference pictures and inter-layer reference (ILR) pictures, e.g., the processed base layer pictures, to reconstruct an enhancement layer video 522. The terms "inter layer reference picture" and "processed base layer pictures" may be used interchangeably herein.

Figure 6:
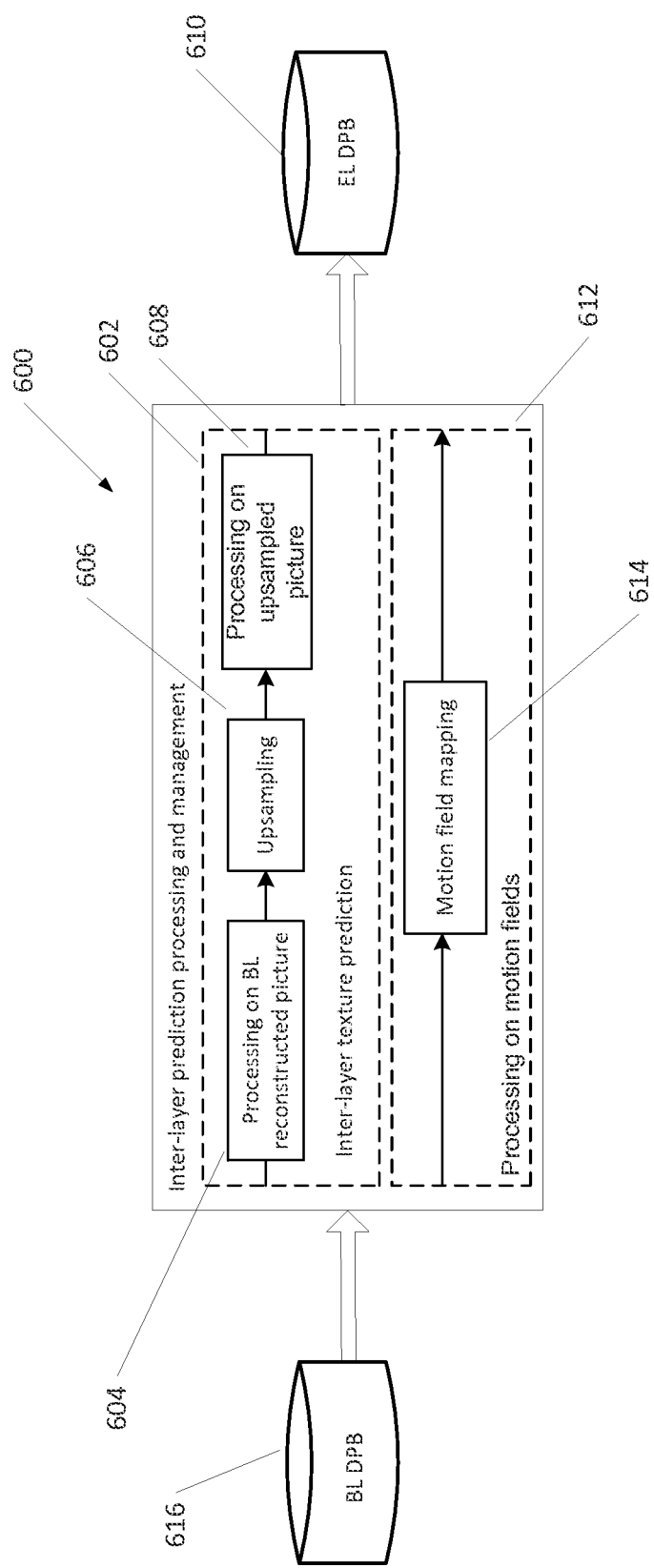
FIG. 6 is a diagram illustrating an example inter-layer prediction processing and management subsystem.

FIG. 6 illustrates an example ILP processing and management subsystem 600. The ILP processing and management subsystem 600 may comprise components for processing base layer (BL) texture samples and/or motion fields. An inter layer texture prediction portion 602, for example, may comprise a number of stages. At 604, a BL reconstructed picture may be enhanced before it is upsampled. At 606, upsampling may be performed when the BL resolution is lower than the enhancement layer (EL) resolution in spatial scalability. The upsampled output may have the same resolution as the EL. Before the upsampled picture is put in an EL DPB 610, another enhancement may be performed at 608 to further improve the quality of the ILR picture. One or more stages may be omitted. For example, in SNR scalability, where the BL picture has the same resolution, but a lower quality, as the EL picture, one or more of the three stages may be skipped, e.g., the BL reconstructed picture can be inserted into EL DPB directly for inter-layer prediction. For example, in spatial scalability, upsampling may be performed at 606, while enhancement may be omitted at 604 and 608, to make the upsampled BL reconstructed picture have the same resolution as the EL picture. The enhancement at 604 and 608 may be used to improve the quality of ILR picture, thus achieving higher efficiency in EL coding.

In addition to the inter layer texture prediction portion 602, which may be used to generate the samples in the ILR picture, a motion field processing portion 612 may be used to generate the motion field (e.g., including motion vectors and reference indices) of the ILR picture by exploiting the correlation of the motion information in the base layer and the enhancement layer. Motion field mapping (MFM) 614 may be used to generate the motion field. The inter-layer pictures as the output of these two parts can function as additional reference pictures in addition to temporal reference pictures in the enhancement layer, which may also comprise 2-D sample arrays and motion fields, and thus improve the efficiency in enhancement layer coding.

Performing picture-level ILP, e.g., only picture-level ILP, in a scalable system may reduce implementation complexity. The base layer and enhancement layer encoder and decoder logics at the block level may be reused without changes. High level (e.g., picture/slice level) configurations involving insertion of one or more of the processed base layer pictures into the enhancement layer DPB may be involved. Block level changes may be allowed in the scalable system to facilitate block-level inter-layer prediction in addition to picture level inter-layer prediction.

The EL encoder may select reference pictures in the EL DPB for the EL coding. For example, the EL encoder may select ILR pictures, which may be the output of the Inter-layer Prediction Processing & Management subsystem, and/or temporal reference pictures, which may be previously coded EL pictures. ILR pictures and temporal reference pictures may have different characteristics.

As depicted in FIG. 6, the ILR picture may be generated by applying processes. Inter layer texture prediction may involve upsampling the BL texture (e.g., if spatial ratio >1) or copying of the BL texture (e.g., if spatial ratio=1). Motion field mapping may scale the compressed BL motion field, which for example, may include the BL block prediction mode, one or more motion vectors, and/or one or more reference picture indices according to the relative scaling ratio between the BL and EL video to generate the motion information for a 16×16 block in the ILR picture. After applying these processes, the ILR picture may be added to the EL DPB.

As shown in FIG. 6, the ILR picture may be generated based on the reconstructed BL picture taken from a BL DPB 616. However, the quality of the ILR picture may not be good enough for an efficient inter-layer prediction of the enhancement. For example, the BL pictures may be coded with coarser quantization, e.g., higher quantization parameter (QP) values. When coarser quantization is applied, the BL reconstructed texture may include undesired coding artifacts such as blocking artifacts, ringing artifacts, color artifacts, etc. This may reduce the effectiveness of inter layer texture prediction. In the case of spatial scalability, the BL pictures may have smaller spatial resolution than the EL pictures, e.g., the downsampling process in FIG. 4 may be applied. To reduce aliasing, a downsampling filter may reduce or remove the high frequency information in the video signal. As a result, the texture information in the ILR picture may lack certain high frequency information, and/or may not be able to provide effective prediction information for coding the EL video.

Figure 7:
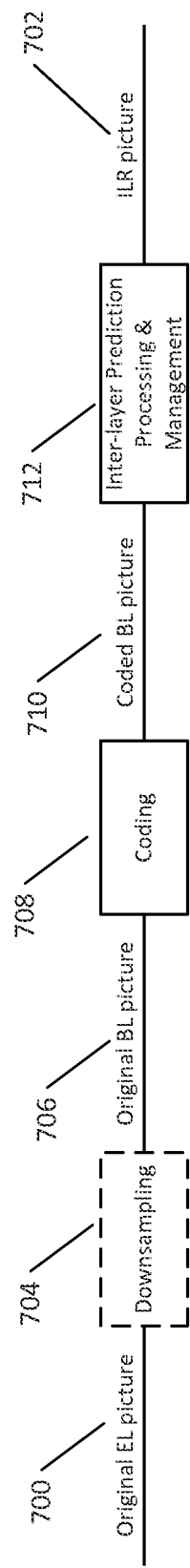
FIG. 7 is a diagram illustrating an example of processing between an original enhancement layer picture and an inter-layer prediction (ILP) picture.

FIG. 7 illustrates an example of processing between an original EL picture 700 and its corresponding ILR picture 702. Downsampling may be applied at 704 to generate an original BL picture 706. Downsampling may be omitted, for example, in the case of SNR scalability. An encoder 708 may encode the BL picture to generate a coded BL picture 710. An inter-layer prediction processing and management subsystem 712 may generate the ILR picture 702.

To illustrate the lost high frequency information in the ILR picture, FIGS. 8B, and 8C show an example of the difference of an original EL picture 800 in FIG. 8A from an EL temporal reference picture 802 in FIG. 8B, and from an ILR picture 804 in FIG. 8C. There may be large differences between the ILR picture 804 and the original EL picture 800 at the edges of the objects, e.g., at the high frequencies.

Compared to the difference picture in FIG. 8C, the temporal reference picture 802 in FIG. 8B may not show such missed high frequency information. The high frequency information from the temporal reference picture 802 may be used to enhance the quality of the ILR picture. An inter-layer motion compensated (ILMC) picture or hybrid ILR picture may be generated. This ILMC picture may include the high frequency components that are missing in the ILR picture. The high frequency components may be extracted from EL reference pictures using a high pass filter to enhance the quality of the ILR picture. A low pass filter may be applied to the ILR texture samples, for example, to reduce the unintended noise information in the ILR picture that may be introduced by the BL coding. The combination of the low frequencies from the ILR picture and the high frequencies from the ILMC picture may provide a better quality than the ILR picture for the inter-layer prediction of the enhancement layer picture.

High frequency information that may be extracted from the EL temporal reference picture and low frequency information that may be extracted from the ILR picture may be combined to improve the quality of the ILR picture and the prediction efficiency for the EL coding may be improved. An inter-layer motion compensation (ILMC) subsystem may apply motion compensation to the EL temporal references, e.g., using BL motion information to generate the ILMC picture. Adaptive filters may be designed and applied to the ILMC and/or ILR pictures. The filtered ILMC picture and the filtered ILR picture may be combined to enhance the quality of the ILR picture. The filter coefficients may be quantized and/or signaled appropriately, such that the overhead may be affordable in a bitstream without penalty in performance. The ILR enhancement method may be enabled and/or disabled based on a picture level and/or block level rate distortion (RD) decision.

A predictor may be generated. For example, high frequency information that may be extracted from the EL temporal reference picture and low frequency information that may be extracted from the ILR picture may be combined to generate a predictor. The predictor may be used for inter-layer prediction of EL coding. One example of a predictor may be an enhanced inter-layer reference (EILR) picture. One or more examples described herein with reference to an EILR picture may be applicable to a predictor, and vice versa. For example, the luminance and chrominance components of an ILR picture may be enhanced to generated an EILR picture, for example, as described herein.

Figure 9:
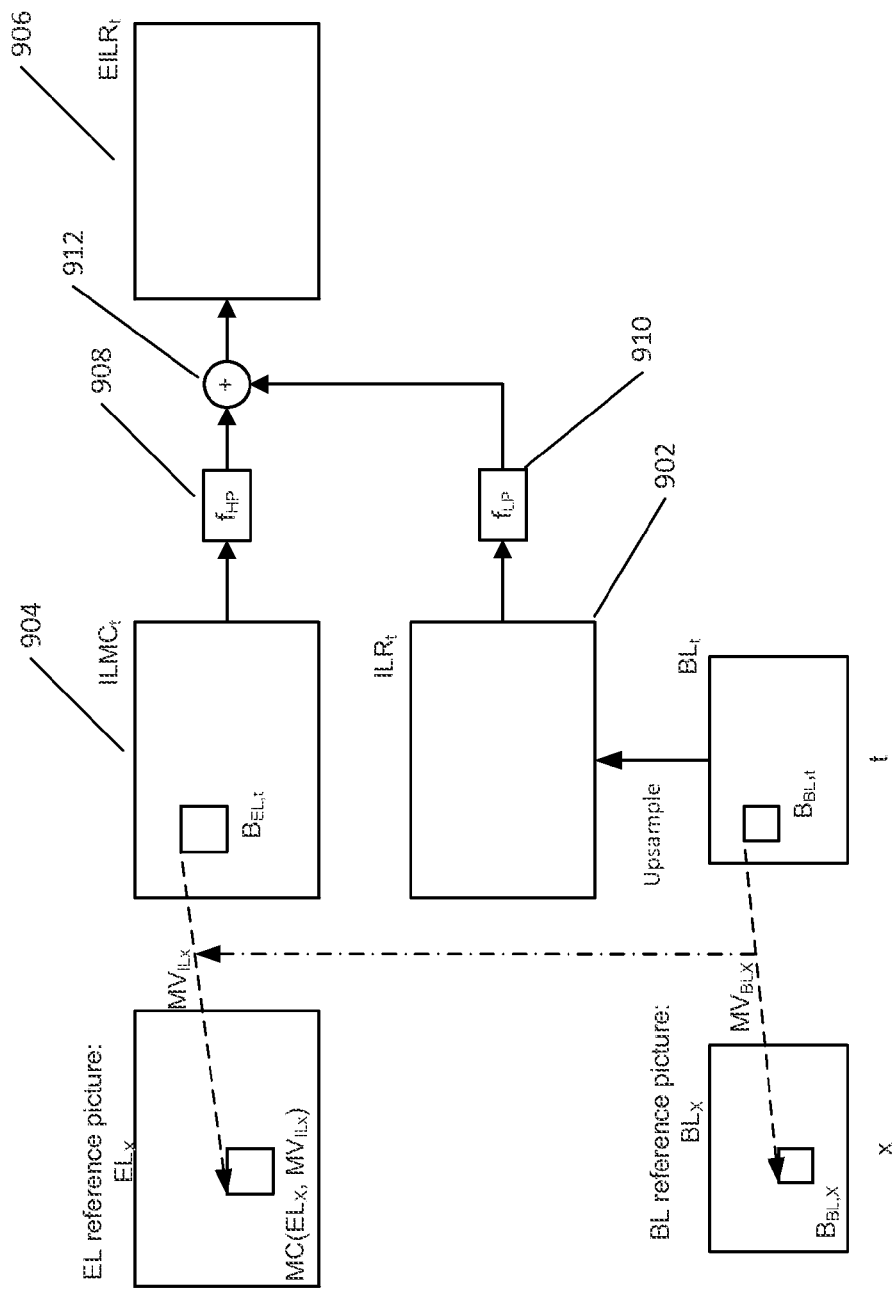
FIG. 9 is a block diagram illustrating an example of ILR enhancement.

A luminance component of the EILR picture may be generated. FIG. 9 illustrates an example of the generation of the luminance component of the EILR picture. An inter-layer reference picture for the EL coding may be generated, for example, by applying motion compensation using the mapped BL motion information on the EL temporal reference picture. For a block $B_{ILMC,t}(x,y)$ in the ILMC picture located at position (x,y) at time t, mvx and mvy may respectively denote the horizontal and vertical components of the mapped BL motion vector $MV_{BL,t}$. When the corresponding BL block is uni-predicted, the block $B_{ILMC,t}(x,y)$ may be generated by motion compensating the matching block in the EL temporal reference picture $EL_x$ as indicated by (mvx,mvy) according to equation (1):

$$B_{ILMC,t}(x,y) = B_{ILMC,t}(x+mvx, t+mvy) \quad (1)$$

When the corresponding BL block is bi-predicted, the block $B_{ILMC,t}(x,y)$ may be generated by combining two prediction components obtained from two EL temporal reference pictures $EL_{x0}$ and $EL_{x1}$ according to equation (2):

$$B_{ILMC,t}(x,y) = \frac{B_{EL,x0}(x+mvx_0, y+mvy_0) + B_{EL,x1}(x+mvx_1, y+mvy_1)}{2} \quad (2)$$

where $(mvx_0, mvy_0)$ and $(mvx_1, mvy_1)$ may be the motion vectors pointing to the reference pictures $EL_{x0}$ and $EL_{x1}$, respectively. When the corresponding BL block is intra-coded, the samples of $B_{ILMC,t}(x,y)$ may be directly copied from those of the collocated block in the ILR picture as noted in equation (3):

$$B_{ILMC,t}(x,y) = B_{ILR,t}(x,y) \quad (3)$$

The EL texture information may include high frequency information that may be removed by the downsampling and/or upsampling process to generate the ILR picture. The blurred edges and textures in the ILR picture may be restored from the corresponding high frequency information of the ILMC picture. The ILR picture may be directly generated from the reconstructed BL pictures, which may be upsampled if the resolutions are different between the BL video and the EL video. The quality of the ILR picture may depend on that of the BL picture, which may include unexpected noise and/or quantization errors. Degraded ILR picture quality may in turn result in less efficient coding of the EL video. The inter-layer prediction may be enhanced by combining the high frequency of the ILMC picture and the low frequency of the ILR picture for the EL coding, for example, to compensate for the quality loss incurred by the lost high frequency, the quantization error, and/or the noise of the ILR picture. Given an ILR picture 902 and an ILMC picture 904 at a time t, a corresponding EILR picture 906 may be generated by applying a high pass filter 908 to the ILMC picture 904 and a low pass filter 910 to the ILR picture 902 and adding the filtered signals at 912 as indicated in equation (4) and illustrated in FIG. 9.

$$EILR_t = f_{LP} \otimes ILR_t + f_{HP} \otimes ILMC_t \quad (4)$$

where $\otimes$ represents 2-D convolution. As shown in equation (4), the EILR picture may be generated from one or more filtering processes. However, other variations of equation (4) may also be usefully applied. For example, for some EL pictures, it may beneficial to apply a low pass filter to the ILR picture but not a high pass filter to the ILMC picture. e.g., it may be beneficial to use the low pass component of the ILR picture exclusively for the EL inter-layer prediction. For some EL pictures, it may be beneficial to apply a high pass filter to the ILMC picture but not a low pass filter to the ILR picture, e.g., it may be beneficial to add the high frequency information to the unfiltered ILR picture. This case might be suitable for SNR scalability where the BL picture and the EL picture have the same resolution. A downsampling/upsampling process, which may reduce the high frequency information in the ILR picture, may be omitted in generating the ILR picture. For yet other EL pictures, it may be beneficial to add the high pass filtered ILMC picture and the low pass filtered ILR picture together, as shown in equation (4). Moreover, in the case that both high pass filter and low pass filter may be applied to generate the EILR picture, the two filters could be derived jointly or separately given the different tradeoff considerations between the complexity of the filter training process and the quality of the EILR picture.

A number of methods may be used to generate the EILR picture.

The EILR picture may be generated by applying a low pass filter to the ILR picture.

The EILR picture may be generated by adding the high frequency information obtained from the high pass filtered ILMC picture to the unfiltered ILR picture.

The EILR picture may be generated by combining the high frequency information obtained from the high pass filtered ILMC picture and the low frequency information obtained from the low pass filtered ILR picture. The two filters may be derived jointly, for example, by optimizing both filters at the same time.

The EILR picture may be generated by combining the high frequency information obtained from the high pass filtered ILMC picture and the low frequency information obtained from the low pass filtered ILR picture. The two filters may be derived separately in such a way that the high pass filter may be derived initially with the ILR picture as part of the training process. After applying the high pass filter to the ILMC picture, the low pass filter may be derived based on the high pass filtered ILMC picture. It is also possible to derive and apply the low pass filter first based on the ILR picture and derive the high pass filter based on the filtered ILR picture.

Examples of detailed derivation processes for the filter coefficients are disclosed herein.

As shown in equations (1) and (2), the mapped BL motion vector $MV_{BL,t}$ may be used to generate the corresponding ILMC picture. The mapped BL motion vectors may be derived from either the compressed motion field of the BL picture or the uncompressed motion field of the BL picture. When the compressed BL motion field is used, the corresponding BL motion may be described in units of 16×16 blocks, e.g., a 16×16 block may have the same motion information, whereas units of 4×4 blocks may be used for an uncompressed BL motion field. Additionally, if uncompressed motion is used for the ILMC picture generation, the compression of the BL motion field may be delayed after the encoding and/or decoding of the corresponding EL picture. The compressed BL motion field may be used for the temporal motion vector prediction of the following BL pictures. Using the uncompressed BL motion field may provide a better quality improvement of the EILR picture in equation (4), but may lead to higher computational complexity.

Given that the ILMC picture may be generated block-wise by applying motion-compensated prediction for a block in the ILMC picture based on the corresponding mapped BL motion information, two neighboring ILMC blocks may have different motion vectors and may produce undesired blocking artifacts between neighboring ILMC blocks (e.g., a fake boundary between neighboring ILMC blocks). When such an ILMC picture is used to derive the high pass filter in equation (4), the fake boundaries may severely degrade the accuracy of the designed high pass filter coefficients, thus reducing the quality of the EILR picture. For a block in the EILR picture, an extended block size of motion-compensated prediction may be considered to generate the corresponding area in the ILMC picture for extracting the high pass information as shown in equation (4). For example, if a block of the EILR picture has a block size N×N and an M×M high pass filter, an extended block with length N+⌊M/2⌋×2 in each direction may be used to generate the corresponding area in the ILMC picture for the high pass filtering, according to equations (1) and (2).

In equation (1) and (2) the mapped BL motion vector, which may be used to generate the ILMC block, may point to either an integer position or a fractional position. Motion compensation with fractional pixel accuracy may involve an interpolation process to calculate the sample values at fractional pixel positions, which may incur high computational complexity and memory access requirements on the generation of the EILR picture. The mapped BL motion vectors in equation (1) and (2) may be rounded to the closest integer pixel positions before forming the corresponding ILMC block, for example, to avoid such fractional motion compensation interpolation.

Chrominance components of the EILR picture may be generated in a number of ways.

The chrominance components of the EILR picture may be generated by directly copying the chrominance components of the ILR picture, e.g., without further processing of the chrominance components except the copy operation.

The chrominance components of the EILR picture may be generated by copying the chrominance components from the ILMC picture. If the corresponding BL block is inter coded, the chrominance components of the EILR block may be obtained by applying motion-compensated prediction on the chrominance components of the EL temporal reference pictures using the mapped BL motion information. If the corresponding BL block is intra coded, the chrominance components of the EILR block may be generated by copying the chrominance blocks from the ILR picture.

The chrominance components of the EILR picture may be generated by using the same ILR enhancement method of the luminance component as described herein to generate the chrominance components in the EILR picture. The chrominance components of the EILR picture may be generated by combining the high frequency of the chrominance components in the ILMC picture and the low frequency of the chrominance components in the ILR picture, as indicated in equation (4).

The chrominance components of the EILR picture may be generated using a weighted prediction of the ILMC chrominance components and the ILR chrominance components.

A reference list may be constructed. The generated EILR picture may be added to the EL reference picture list for inter-layer prediction. Given that the ILR picture and the EILR picture may have different characteristics due to the different generation methods, both the ILR picture and the EILR picture may be included in the EL reference picture lists. If the EL slice is a P-Slice, the EILR picture may be added as one additional reference picture after the ILR picture in a reference list L0. If the EL slice is a B-Slice, the EILR picture may be placed at the end of a reference list L1, while the ILR picture may be placed at the end of reference list L0.

To reduce the encoding/decoding complexity, the EILR may be used to replace the ILR picture in reference list L0, and reference list L1 if the EL slice is a B-Slice.

The EILR picture may be inserted in list L0, list L1, or both by using an ILR picture reordering command signaled, e.g., signaled explicitly at the slice level. The position in the reference picture list at which the EILR picture may be added may be selected. The decision may be based on the usage of the EILR picture in previous coded pictures. For example, if the EILR picture usage is increasing, then the EILR picture can be moved forward in the list. If the EILR picture usage is decreasing, then it can be moved backward accordingly.

The filter coefficients of the high pass filter and low pass filter in equation (4) may be derived. For example, to derive the optimal filter coefficients $f_{opt}(i,j)$ including the coefficients of the high pass filter and/or low pass filter, which can minimize the distortion between the original EL picture at time t, which may be denoted as $Org_{EL,t}$, and the generated EILR picture $EILR_t$. Depending on the selected method of generating the EILR picture, different methods may be applied to derive the optimal filter coefficients, as described herein.

Figure 10:
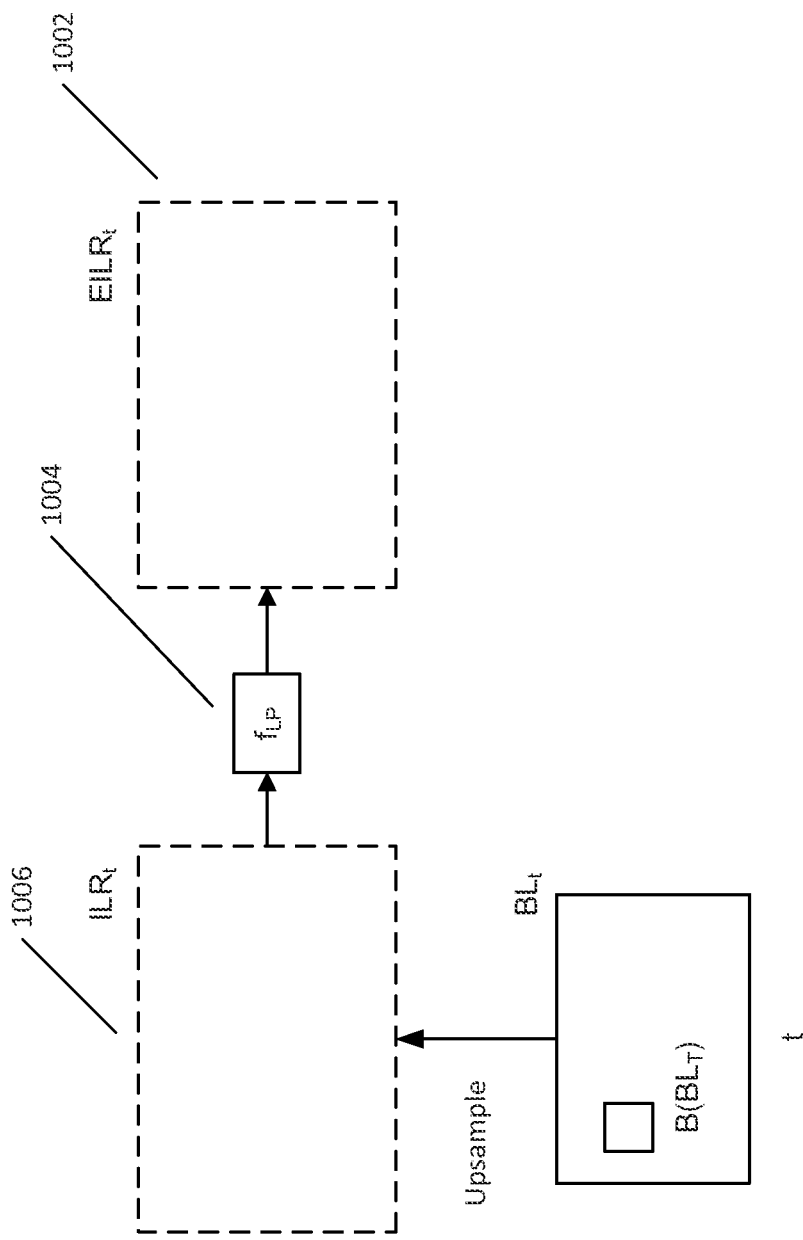
FIG. 10 is a block diagram illustrating another example of ILR enhancement.

As shown in FIG. 10, an EILR picture 1002 may be generated by applying a low pass filter 1004 to an ILR picture 1006. Equation (4) may be simplified as $$EILR_t = f_{LP} \otimes ILR_t \quad (5)$$

The linear minimum mean square error (LMMSE) estimation method may be applied to derive the optimal coefficients of the low pass filter 1004. The LMMSE module may use samples of $LR_t$ and $Org_{EL,t}$ as an input training data set and may output the optimal filter coefficients such that the distortion between $Org_{EL,t}$ and $EILR_t$ may be reduced or minimized as shown in equation (6).

$$f_{opt} = \arg\min[\Sigma_{x,y}(\Sigma_{i,j}f_{LP}(i,j) \times ILR_t(x+i,y+j) - Org_{EL,t}(x,y))^2] \quad (6)$$

To ensure the low pass nature of the derived coefficients of $f_{LP}$, it may be enforced during the LMMSE training process that the summation of the coefficients of $f_{LP}$ may equal one.

Figure 11:
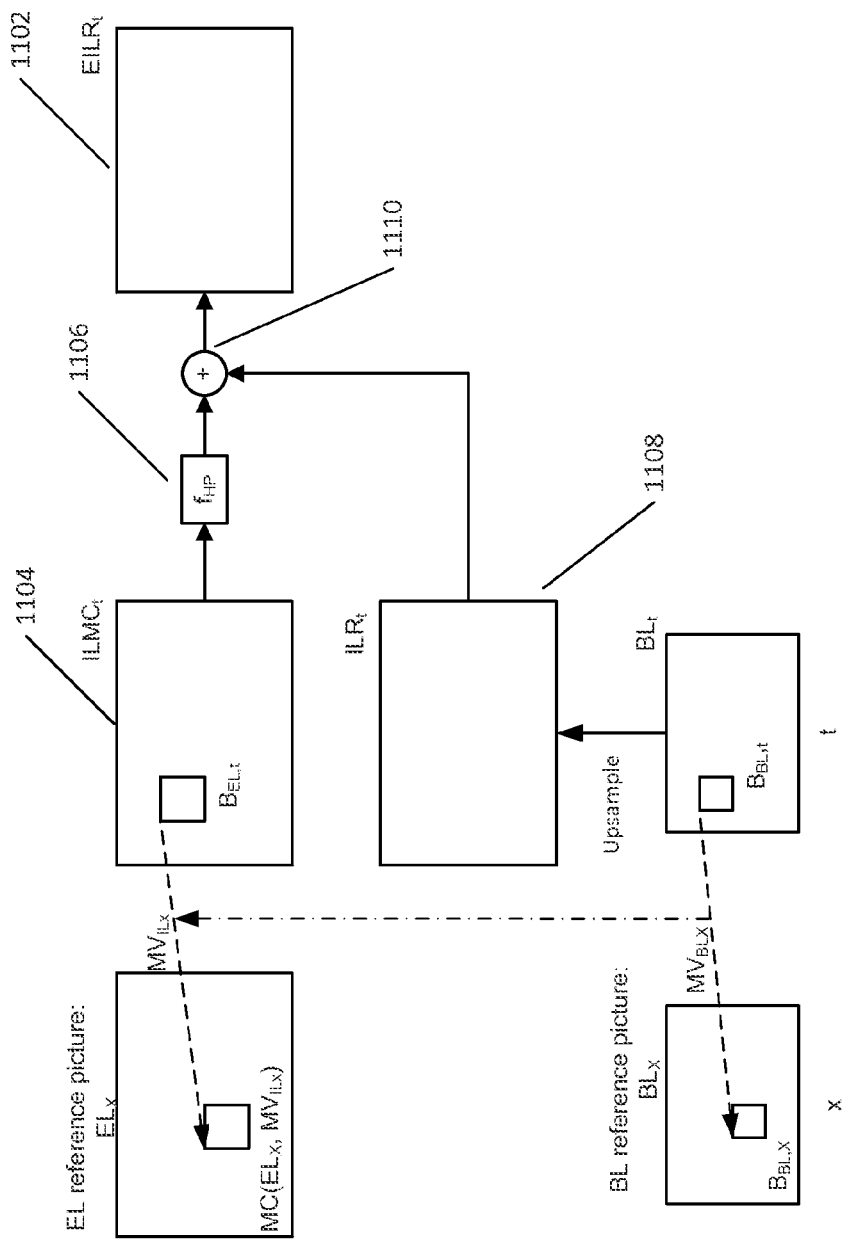
FIG. 11 is a block diagram illustrating yet another example of ILR enhancement.

As shown in FIG. 11, an EILR picture 1102 may be generated by adding high frequency information obtained from an ILMC picture 1104 by a high pass filter 1106 to an ILR picture 1108. Equation (4) may be simplified as $$EILR_t = ILR_t + f_{HP} \otimes ILMC_t \quad (7)$$

The LMMSE module may use samples of $ILMC_t$, $ILR_t$, and $Org_{EL,t}$ as an input training data set and may output the optimal filter coefficients based on the LMMSE estimation in equation (8).

$$f_{opt} = \arg\min[\Sigma_{x,y}(\Sigma_{i,j}f_{HP}(i,j) \times ILMC_t(x+i,y+j) + ILR_t(x,y) - Org_{EL,t}(x,y))^2] \quad (8)$$

To ensure the high pass nature of the derived coefficients of $f_{HP}$, it may be enforced during the LMMSE training process that the summation of the coefficients of $f_{HP}$ may equal zero.

As shown in FIG. 9, the EILR picture 906 may be generated by combining the high frequency information obtained from the ILMC picture 904 by the high pass filter 908 and the low frequency information obtained from the ILR picture 902 by the low pass filter 910, e.g., according to equation (4). The optimal coefficients of $f_{HP}$ and $f_{LP}$ may be jointly derived by solving the LMMSE problem, e.g., as indicated in equation (9).

$$f_{opt} = \arg\min[\Sigma_{x,y}(\Sigma_{i,j}f_{HP}(i,j) \times ILMC_t(x+i,y+j) + \Sigma_{i,j}f_{LP}(i,j) \times ILR_t(x+i,y+j) - Org_{EL,t}(x,y))^2] \quad (9)$$

To ensure that the energy of the generated EILR picture may be consistent with that of the ILR picture, it may be enforced during the LMMSE training process that the summation of the components of $f_{HP}$ and $f_{LP}$ may equal one.

The joint derivation of the coefficients of two filters may achieve a global optimal solution of the filter coefficients in terms of minimized distortion between the original EL picture and the output EILR picture. However, given the increased number of input coefficients for a single training process, the joint training method may involve multiplying and inverting large matrices, which may increase the computational complexity of the LMMSE training process. The filter coefficients derived from the joint training method may not be a high pass filter and a low pass filter, e.g., may be other than a high pass filter and/or a low pass filter. In order to ensure the high pass characteristic and the low pass characteristic of the output filters, the constrained joint derivation method may be applied to calculate the filter coefficients of $f_{HP}$ and $f_{LP}$ by enforcing that $f_{HP}$ is a high pass filter and $f_{LP}$ is a low pass filter. For example, the filter coefficients $f_{HP}$ and $f_{LP}$ may be also derived based on equation (9) but with a constraint that the summation of the coefficients in $f_{HP}$ equals 0 and the summation of the coefficients in $f_{LP}$ equals 1. To reduce complexity and ensure the high pass nature and the low pass nature of two output filters, the coefficients of the two filters may be derived separately. The coefficients of $f_{HP}$ may be derived based on equation (8) by using the samples of the ILR picture as the input for LMMSE training and enforcing that the summation of the coefficients may be equal to zero. The derived filter $f_{HP}$ may be applied to the ILMC picture $ILMC_t$ to generate the corresponding high frequency picture $ILMC_t^h$. By using the samples of $ILMC_t^h$ as the input, in the second stage of the training process, the coefficients of $f_{LP}$ may be obtained by solving the LMMSE estimation problem in equation (10) with the constraint that the summation of the filter coefficients may be equal to one.

$$f_{opt} = \arg\min[\Sigma_{x,y}(ILMC_t^h(x,y) + \Sigma_{i,j}f_{LP}(i,j) \times ILR_t(x+i,y+j) - Org_{EL,t}(x,y))^2] \quad (10)$$

An unconstrained joint derivation method may be applied to calculate the filter coefficients. In an unconstrained joint derivation method, $f_{HP}$ may not be constrained to be a high pass filter, and/or $f_{LP}$ may not be constrained to be a low pass filter, e.g., $f_{HP}$ and/or $f_{LP}$ may be arbitrary filters.

The size of the filters may be proportional to the size of the overhead and the computational complexity. For example, a 3×3 filter may have nine filter coefficients to be transmitted and may involve nine multiplications and eight additions to filter one sample, and a 5×5 filter may have 25 filter coefficients to be transmitted and may involve 25 multiplication and 24 additions to filter one sample. Larger filters can provide better results. The filter size may be selected to achieve a balance of computational complexity, overhead, and performance. Simulation results have indicated that a filter size of 3×3 produces a satisfactory tradeoff for the method. The filter size may be changed by the user, for example, to achieve a different balance between complexity and performance for a specific coding system.

The filter derivation methods disclosed herein may be implemented in such a way that the available samples of the ILMC picture and the ILR picture may be used for the LMMSE training process. Although the generated EILR may improve the inter-layer prediction efficiency of the EL coding, the quality of the EILR picture may be further increased by applying a multi-pass encoding. In this scenario the filter coefficients may be derived twice. For example, the first derivation procedure may use the available samples (e.g., as described herein) for the LMMSE training. The resulting filter coefficients may be used to generate the corresponding EILR picture for encoding the EL picture.

After the EL picture is encoded, the encoder may record the positions of the EILR samples that are referenced by the EL picture. In the second pass, the encoder may use these referenced sample positions to derive the filter coefficients. The second set of filter coefficients may be better than the first set of filter coefficients in that the filter coefficients derived from the second pass may increase and/or maximize the quality of the EILR pixels that are used for the EL prediction, whereas the filter coefficients obtained from the first pass may sacrifice the quality of the referenced EILR pixels by over-enhancing the non-referenced EILR pixels.

Filters (e.g., fixed predefined filters) may be used for the low pass filter and/or the high pass filter. In this case, the filters that are applied to the ILR picture and/or the ILMC picture may be selected from a list of previously defined filters. This list may be known to the decoder. If the list is known to the decoder, the filter coefficients may not be signaled; instead, an index or indices for the selected filter or filters may be signaled. For example, these filters may be designed to reflect different spatial scaling ratios, reflecting the expected loss of high frequency. Predefined filters may also simplify the encoding complexity by avoiding the filter derivation process.

The trained filters may have real value coefficients, which may be quantized before transmission. The real value filter $f_{float}$ may be approximated by an integer value filter, which may be denoted as $f_{int}$. A uniform quantizer may be used for the quantization. The precision of the quantizer may be chosen with respect to the dynamic range of the coefficients. The precision of the quantizer may depend on the method used for training the filter. For example, the precision of the quantizer may be four bits per coefficient for filter training methods using low frequency information individually or in combination with high frequency information and six bits per coefficient for filter training methods using high frequency information. Other quantizers may be chosen by the user if they perform better for a specific coding system.

A factor, e.g., the quantizer step size k, may be used to describe the relation between the real value filter and the integer value filter as shown in equation (11).

$$f_{float} = f_{int} \times k \quad (11)$$

In equation (11), the factor k may be real-valued. To signal this factor k in the bitstream, the factor k may be approximated with two integer values M and N according to equation (12).

$$k \approx \frac{M}{2^N} \quad (12)$$

The factor k can be applied as a multiplication with the integer value M followed by a bit shift of N bits to the right. Once a floating point k is calculated, its integer approximation with M and N can be calculated using equations (13) and (14).

$$N = \min\left\{2^{n\_bits} - 1, \max\left[0, \text{Round}\left(\log_2\left(\frac{2^{m\_bits}}{abs(k)}\right)\right)\right]\right\} \quad (13)$$

$$M = \min\{2^{m\_bits} - 1, \text{Round}[abs(k) \times 2^N + 0.5]\} \quad (14)$$

where n_bits is the number of bits for the factor N, m_bits is the number of bits for the factor M, Round(x) represents the rounding of x downwards to the next integer value, abs(x) represents the absolute value of x, and min(x,y) and max(x,y) represent the minimum and maximum value of x and y, respectively.

k may equal the quantizer step size. Due to rounding issues during the quantization process, the actual value of k may be slightly different from the quantizer step size. For example, if the summation of the filter coefficients may be equal to 32, it may happen that it the summation may equal a nearby value, such as 31 or 33. The factor k may be further optimized, e.g., using an energy-based optimization and/or a coefficient-based optimization.

In an energy-based derivation of k, for example, the factor k may be optimized based on energy calculations. Depending on which of the filter training methods is used, different energies may be calculated. $\text{Sum}_{LP}(x,y)$ may stand for the summation during the low pass filtering process for the sample at position (x,y). $\text{Sum}_{HP}(x,y)$ may stand for the summation during the high pass filtering process for the sample at position (x,y). These sums are disclosed in equations (27) and (28) herein.

The low pass ILR filter, e.g., only the low pass ILR filter, may be trained. The factor k may be calculated in such a way that the distortion energy between the EILR picture and the original EL picture may be reduced or minimized, k may be calculated as described in equation (15).

$$k = \frac{\sum_{x,y} \text{Sum}_{LP}(x, y) \times \text{Org}_{EL,t}(x, y)}{\sum_{x,y} \text{Sum}_{LP}(x, y) \times \text{Sum}_{LP}(x, y)} \quad (15)$$

The high pass ILMC filter. e.g., only the high pass ILMC filter, may be trained. The factor k may be calculated in such a way that the distortion energy between the filtered ILMC picture and the original difference picture is reduced or minimized. The original difference picture may be defined as the difference between the original EL picture and the ILR picture. k may be derived as described in equation (16).

$$k = \frac{\sum_{x,y} \text{Sum}_{HP}(x, y) \times (\text{Org}_{EL,t}(x, y) - ILR_t(x, y))}{\sum_{x,y} \text{Sum}_{HP}(x, y) \times \text{Sum}_{HP}(x, y)} \quad (16)$$

For the joint training of two filters, the distortion energy between the EILR picture and the original EL picture may be reduced or minimized. k may be calculated as described in equation (17).

$$k = \frac{\sum_{x,y} (\text{Sum}_{LP}(x, y) + \text{Sum}_{HP}(x, y)) \times \text{Org}_{EL,t}(x, y)}{\sum_{x,y} (\text{Sum}_{LP}(x, y) + \text{Sum}_{HP}(x, y)) \times (\text{Sum}_{LP}(x, y) + \text{Sum}_{HP}(x, y))} \quad (17)$$

Multiple factors, e.g., two factors, may be used for the separate training of multiple factors, e.g., two filters. The factor $k_{HP}$ for the ILMC filter may be calculated based on equation (18).

$$k_{HP} = \frac{\sum_{x,y} \text{Sum}_{HP}(x, y) \times (\text{Org}_{EL,t}(x, y) - ILR_t(x, y))}{\sum_{x,y} \text{Sum}_{HP}(x, y) \times \text{Sum}_{HP}(x, y)} \quad (18)$$

The ILMC filter may be applied to the ILMC picture using the factor $k_{HP}$, resulting in $\text{ILMC}_{t,filt}$. The ILR filter may be applied to the ILR picture without consideration of a factor since the factor $k_{LP}$ may not yet be calculated, resulting in $\text{ILR}_{t,filt}$. After applying the filters, the second factor $k_{LP}$ for the ILR filter may be calculated according to equation (19).

$$k_{LP} = \frac{\sum_{x,y} \text{Sum}_{LP}(x, y) \times (\text{Org}_{EL,t}(x, y) - \text{ILMC}_{t,filt}(x, y))}{\sum_{x,y} \text{Sum}_{LP}(x, y) \times \text{Sum}_{LP}(x, y)} \quad (19)$$

Once k, or in the case of the separate training, the two factors $k_{HP}$ and $k_{LP}$, are calculated, equations (13) and (14) may be applied to find integer approximations for the factor(s). For the separate training, the two factors $k_{HP}$ and $k_{LP}$ may be different. Two sets of M and N may be used; one set ($M_{HP}$ and $N_{HP}$) for $k_{HP}$ and another set ($M_{LP}$ and $N_{LP}$) for $k_{LP}$.

This method may be applicable to various types of filters independently of their independent summation. Even though M and N may be signaled in the bitstream, the overhead of signaling two integers A and N may be relatively minor.

In a coefficient-based derivation of k, the factor k may be calculated based on the value of the filter coefficients. This method may be applied if the summation of the floating point coefficients is equal to one. That is the case for the filter training methods using low frequency information individually or in combination with high frequency information and the ILR filter of the joint derivation filter training method. The factor k may be calculated using equation (20).

$$k = \frac{1}{\text{sum\_filter\_coeff}} \quad (20)$$

with sum_filter_coeff being the summation of the filter coefficients.

M and N may or may not be transmitted in the bitstream, since the summation of the coefficients can be calculated at the decoder as well. It may be applied, e.g., if the summation of floating point coefficients is equal to one.

After the filters are designed and/or quantized, the filters may be applied to the ILMC picture and/or the ILR picture, respectively. The outputs of the two filters may be combined to form the EILR picture. Equations (21)-(31) describe an example of the filtering and combination of the filter outputs. In equations (21)-(31)

$$n = \left\lfloor \frac{s}{2} \right\rfloor$$

denotes the size of the padding area, e.g., the filter range to each side of the current sample when the filter is of size S×S.

When the ILR filter is trained, the process may be described by equations (21)-(23).

$$\text{Sum}(x,y) = \sum_{i=-n}^{n} \sum_{j=-n}^{n} \text{ILR}(x+i, y+j) \times h_{LP}(i,j) \quad (21)$$

$$\text{ILR}_{filt}(x,y) = \text{Round}\{[\text{abs}(\text{Sum}(x,y) \times M_{LP}) + (1 << (N_{LP}-1))] >> N_{LP}\} \times \text{sign}(\text{Sum}(x,y) \times M_{LP}) \quad (22)$$

$$\text{EILR}(x,y) = \text{Clip}(\text{ILR}_{filt}(x,y)) \quad (23)$$

When the ILMC filter is trained, the process may be described by equations (24)-(26).

$$\text{Sum}(x,y) = \sum_{i=-n}^{n} \sum_{j=-n}^{n} \text{ILMC}(x+i, y+j) \times h_{HP}(i,j) \quad (24)$$

$$\text{ILMC}_{filt}(x,y) = \text{Round}\{[\text{abs}(\text{Sum}(x,y) \times M_{HP}) + (1 << (N_{HP}-1))] >> N_{HP}\} \times \text{sign}(\text{Sum}(x,y) \times M_{HP}) \quad (25)$$

$$\text{EILR}(x,y) = \text{Clip}(\text{ILR}(x,y) + \text{ILMC}_{filt}(x,y)) \quad (26)$$

If both filters are trained, the process may be described by equations (27)-(31).

$$\text{Sum}_{HP}(x,y) = \sum_{i=-n}^{n} \sum_{j=-n}^{n} \text{ILMC}(x+i, y+j) \times h_{HP}(i,j) \quad (27)$$

$$\text{Sum}_{LP}(x,y) = \sum_{i=-n}^{n} \sum_{j=-n}^{n} \text{ILR}(x+i, y+j) \times h_{LP}(i,j) \quad (28)$$

$$\text{ILMC}_{filt}(x,y) = \text{Round}\{[\text{abs}(\text{Sum}_{HP}(x,y) \times M_{HP}) + (1 << (N_{HP}-1))] >> N_{HP}\} \times \text{sign}(\text{Sum}_{HP}(x,y) \times M_{HP}) \quad (29)$$

$$\text{ILR}_{filt}(x,y) = \text{Round}\{[\text{abs}(\text{Sum}_{LP}(x,y) \times M_{LP}) + (1 << (N_{LP}-1))] >> N_{LP}\} \times \text{sign}(\text{Sum}_{LP}(x,y) \times M_{LP}) \quad (30)$$

$$\text{EILR}(x,y) = \text{Clip}(\text{ILR}_{filt}(x,y) + \text{ILMC}_{filt}(x,y)) \quad (31)$$

In these equations, abs(x) may denote the absolute value of x, <<x and >>x may denote bitshifts to the left and/or right by x bit positions. Sign(x) may return the sign of x, and min(x,y) and max(x,y) may return the minimum and/or maximum value of x and y, respectively. The subscripts of AM and N may indicate whether this factor belongs to the HP filter or to the LP filter. In the case of a joint filter derivation process, the factors may be equal for both filters. The Round( ) operator means that the following term is rounded downwards to the next integer value. The $1 << (N_{LP/HP}-1)$ term may be part of this rounding operation. In equations (22), (26), and (31), the value of the EILR sample may be clipped to the dynamic range of the used bit depth, e.g., to the range of 0 to 255 for 8-bit samples.

The ILR enhancement may be selectively enabled and/or disabled. The generated EILR picture may or may not be capable of improving the inter-layer prediction for the pictures of the EL video sequence, especially given the additional signaling overhead, e.g., filter coefficients and parameters such as normalization factors. For this purpose, a LagrangianRD cost-based comparison may be used to enable and/or disable the ILR enhancement method on a picture or slice level. For example, the decision on whether to enable or disable the usage of the EILR picture may be based on comparing the RD costs of the case when the EILR picture is disabled ($RD_{ILR}$) and the case when the EILR picture is enabled according to equation (32) and equation (33) respectively.

$$RD_{ILR} = D_{ILR} \quad (32)$$

$$RD_{EILR} = D_{EILR} + \lambda \times (\text{num\_bits\_coeff} + \text{num\_bits\_factor}) \quad (33)$$

where $D_{ILR}$ and $D_{EILR}$ may denote the distortions of the ILR and EILR picture, respectively, when compared to the original EL picture. Different metrics may be applied to derive the distortion, such as, but not limited to, sum of square error (SSE), sum of absolute difference (SAD), and/or sum of absolute transformed differences (SATD). num_bits_coeff may be the overhead of encoding the quantized filter coefficients, and num_bits_factor may be the overhead of encoding the factor M and its corresponding shift N. λ may be the Lagrangian weighting factor. If $RD_{EILR}$ is smaller than $RD_{ILR}$, the EILR picture may show a better tradeoff between the enhanced inter-layer prediction quality and the increased overhead than the ILR picture with regard to the performance of the EL coding. The ILR enhancement method may be enabled for the EL picture. Otherwise (e.g., if $RD_{EILR}$ is larger than or equal to $RD_{ILR}$), the ILR enhancement may be disabled for the EL picture. The usage of the ILR enhancement may be signaled to the decoder side by a high level signaling method.

The Lagrangian RD based picture level switch method may be further improved by applying region-based enhancement on the samples of the ILR pictures. In using picture-level switch the same filters may be applied to the samples of the ILR picture. Although the average quality of the ILR picture can be improved, there may be the case that the quality of some regions of the ILR picture may increase, while the quality of other regions may become worse. In order to improve the quality of the ILR picture, a region-based switch method may be used to decide whether an enhancement method should be applied to a particular region or not. A region may be an operational unit at any level and of any size, e.g., a region of a specified dimension and location in the picture, a group of blocks (e.g., LCU, CU, PU), or the like. For the region-based switch method, the EILR picture may be generated as usual. The distortion between the EILR picture and the original EL picture and the distortion between the ILR picture and the original EL picture may be compared on the selected operation level, respectively. For example, a region-based method may operate at the 64×64 block level. If the distortion of an EILR unit of size 64×64 is lower than the distortion of the corresponding ILR unit of size 64×64 at a given location, the samples of the EILR unit may remain to be used to generate the EILR picture. Otherwise, e.g., if the EILR distortion is larger or equal to the ILR distortion, the samples of the ILR unit may be used to replace the samples of the EILR unit. The usage of the ILR enhancement may be signaled for a region such that the decoder can generate the same EILR picture for decoding. An EILR map may be generated. The EILR map may include one flag for a region (for example, a 64×64 block) indicating whether the region is enhanced or not. In order to reduce the overhead of the bitstream, the EILR map may be compressed using some popular source coding methods, e.g., exponential-Golomb code, run-length code, and/or arithmetic code.

Figure 12:
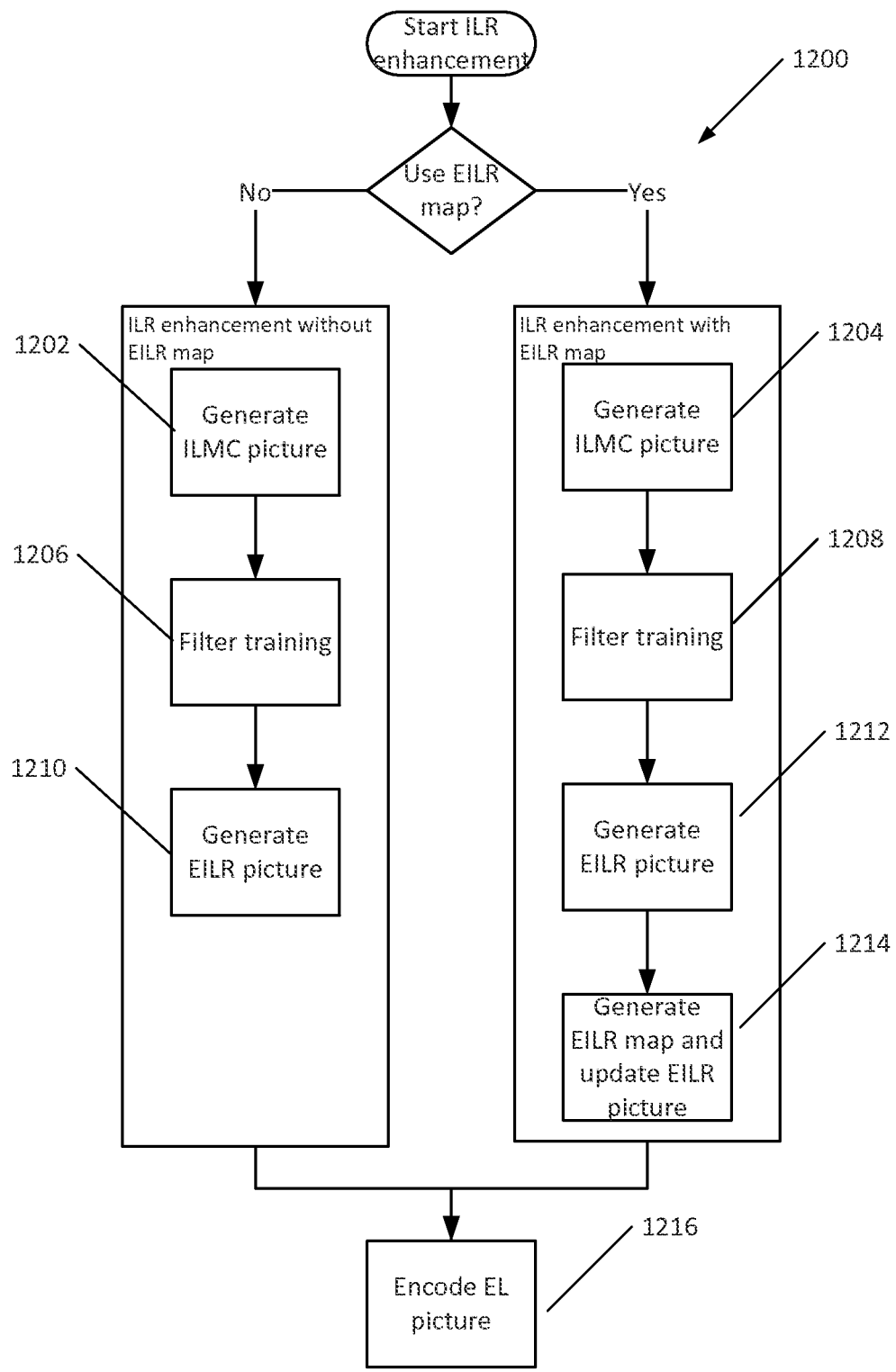
FIG. 12 is a flow diagram illustrating examples of ILR enhancement.
Figure 13:
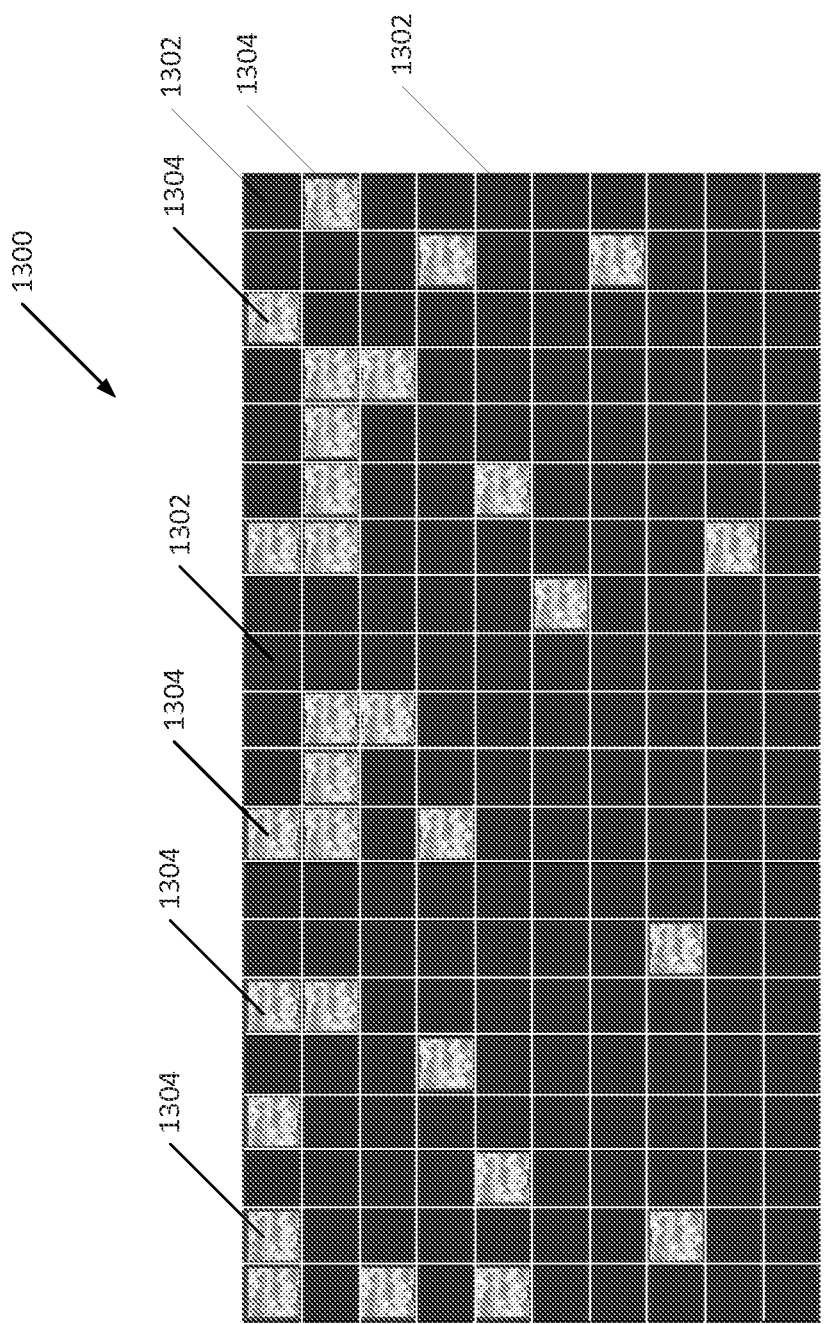
FIG. 13 is a diagram illustrating an example EILR map.

FIG. 12 illustrates an example ILR enhancement process 1200 with and without the EILR map. At 1202 and 1204, an ILMC picture may be generated, regardless of whether an EILR map is used. At 1206 and 1208, one or more filters may be trained. At 1210 and 1212, an EILR picture is generated, regardless of whether the EILR map is used. If an EILR map is used, it may be generated, and the EILR picture may be updated, at 1214. The EL picture may be encoded at 1216. FIG. 13 illustrates an example EILR map 1300 depicting enhanced (EILR) blocks 1302 and unenhanced (ILR) blocks 1304.

Given the EILR map 1300, the encoder may know the regions where the quality of the EILR samples may outperform that of the ILR samples. This knowledge may improve the efficiency of the inter-layer prediction, for example, by applying a second derivation process for the filter coefficients. In the second derivation process, the samples of the regions 1302 where the ILR enhancement is enabled may be used to train the filter coefficients, e.g., the samples of the regions 1304 may be omitted.

Figure 14:
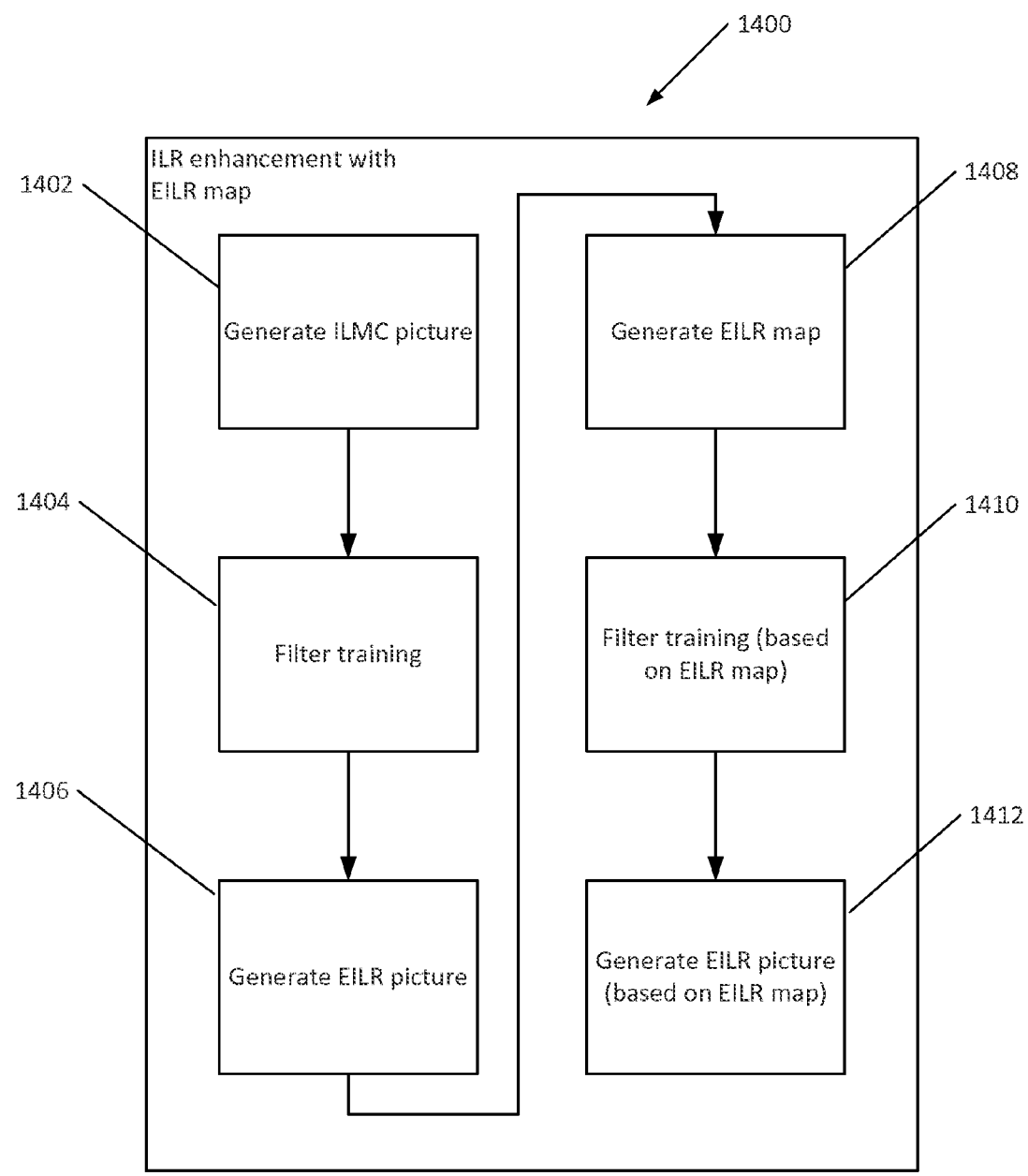
FIG. 14 is a flow diagram illustrating another example of ILR enhancement.

FIG. 14 illustrates an example ILR enhancement process 1400 using the two-filter derivation processes. At 1402, an ILMC picture may be generated. One or more filters may be trained at 1404. An EILR picture may be generated at 1406. An EILR map may be generated at 1408. The map may be used for filter training at 1410. At 1412, an EILR picture may be generated based on the EILR map.

To apply the ILR enhancement for the inter-layer prediction of the EL, the EILR map, the quantized integer filter coefficients, and the scaling factor may be signaled in the bitstream as part of the slice header to let the decoder regenerate the same EILR picture for decoding. For example, Table 1 illustrates an example of modified signaling of the slice header when the joint filter derivation process is applied with 4-bit precision for the filter coefficients.

TABLE 1

The modified slice segment header

| | Descriptor |
|---|---|
| slice_segment_header( ) { | |
| ... | |
| eilr_enabled_flag | u(1) |
| if ( eilr_enabled_flag ) { | |
| for( i = 0; i < num_coeff_hp; i++) | |
| eilr_coeff_hp_plus8[i] | u(4) |
| for( i = 0; i < num_coeff_lp; i++) | |
| eilr_coeff_lp_plus8[i] | u(4) |
| eilr_scaling_factor_abs | u(10) |
| if ( eilr_scaling_factor_abs ) { | |
| eilr_factor_sign | u(1) |
| eilr_bit_shift | u(5) |
| } | |
| } | |
| slice_segment_header_extension_length | ue(v) |
| for( i = 0; i < slice_segment_header_extension_length; i++) | |
| slice_segment_header_extension_data_byte[ i ] | u(8) |
| } | |
| byte_alignment( ) | |
| } | |

A flag eilr_enabled_flag may have a value of 1 if the ILR enhancement is enabled for the current slice. The flag eilr_enabled_flag may have a value of 0 if the ILR enhancement is disabled for the current slice.

A value eilr_coeff_hp_plus8[i]minus 8 may specify the $i^{th}$ coefficient of the high pass filter used for the ILR enhancement. The value of ellr_coeff_hp_plus8[i] should be in the range of 0 . . . 15, inclusive.

A value eilr_coeff_lp_plus8[i]minus 8 may specify the $i^{th}$ coefficient of the low pass filter used for the ILR enhancement. The value of ellr_coeff_lp_plus8[i] should be in the range of 0 . . . 15, inclusive.

A value eilr_scaling_factor_abs may specify the absolute value of the scaling factor for dequantizing the filter coefficients.

A value eilr_factor_sign may specify the sign of the scaling factor for dequantizing the filter coefficients.

A value eilr_bit_shift may specify the number of bits to be right-shifted after the scaling operation when dequantizing the filter coefficients.

Syntax elements num_coeff_hp and num_coeff_lp may specify the number of the coefficients of the high pass filter and the low pass filter, respectively.

Different ILR enhancement methods may be used to generate the EILR picture. The decision on which method is selected can be made on a sequence level and/or on a picture/slice level. If the decision is made on a sequence level, the selected method may be used for multiple pictures, e.g., all the pictures of the video sequence. The selected ILR enhancement method may be signaled in any parameter set, such as Video Parameter Set (VPS), Sequence Parameter Set (SPS), and/or Picture Parameter Set (PPS). Different pictures/slices can use different ILR enhancement methods if the decision is made on a picture/slice level. A default method may be selected on a sequence level and a different method may be selected for a particular picture at a picture level and signaled at a picture level.

In addition to the selection methods of using one specific ILR enhancement method for an EL picture, it is also possible to use multiple ILR enhancement methods, e.g., to generate multiple EILR pictures. The EILR pictures may show different characteristics and may provide different prediction signals when used as the reference picture for the EL coding. For example, some EILR pictures are capable of compensating the lost high frequency of the BL picture, while some EILR pictures can mitigate the compression artifacts of the BL picture. The EL compression efficiency may be improved if multiple EILR pictures generated from different methods are combined. Multiple EILR pictures may be combined by selecting an EILR picture, e.g., a best EILR picture, and adding it to the reference picture lists. Multiple EILR pictures may be combined by adding more than one EILR picture to the reference picture lists. A decision regarding how to combine multiple EILR pictures can be made on a sequence level and/or on a picture level by signaling in the VPS, the SPS, the PPS or the slice header.

Figure 15:
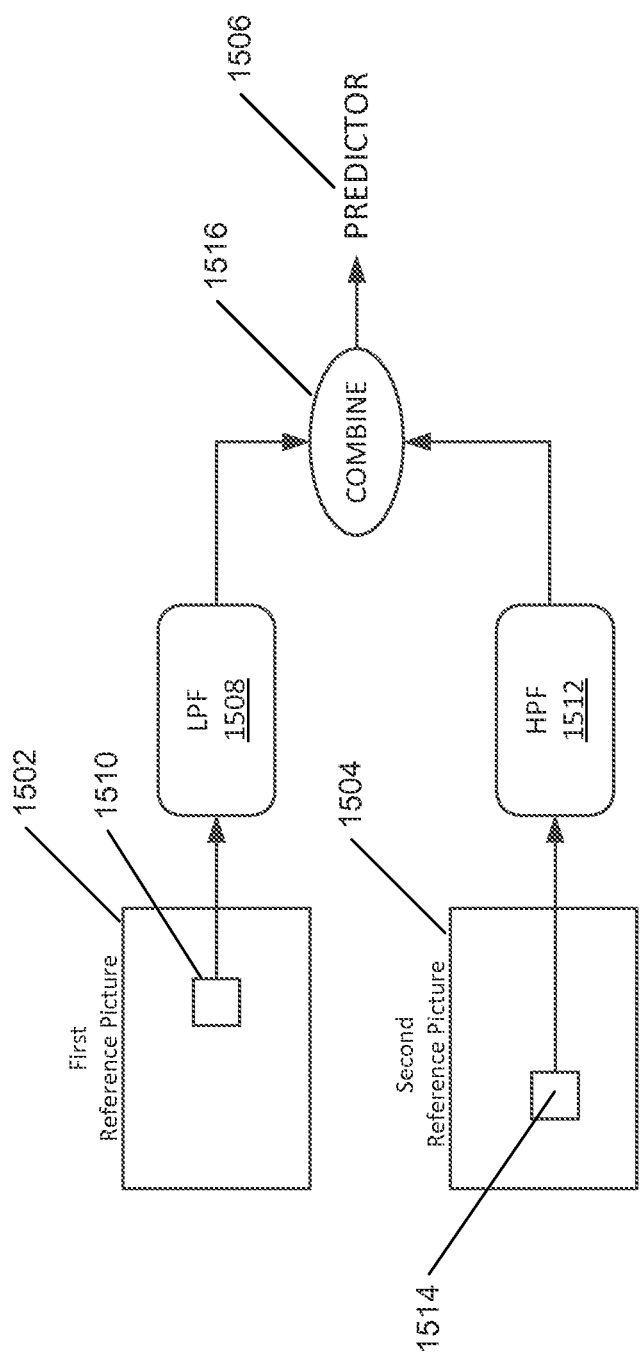
FIG. 15 is a block diagram illustrating an example of ILR enhancement.

FIG. 15 illustrates an example of ILR enhancement. Given a first reference picture 1502 and a second reference picture 1504 where both reference pictures may be available at a time t, a predictor 1506 may be generated by applying a low pass filter 1508 to first data 1510 (e.g., pixel values) of the first reference picture 1502 and a high pass filter 1512 to second data 1514 of the second reference picture 1504. For example, the first reference picture 1502 may be an upsampled, previously decoded base layer picture, e.g., an ILR picture. The second reference picture 1504 may be a previously decoded enhancement layer picture, e.g., an ILMC picture. The second data 1514 may comprise motion compensated pixel values of the ILMC picture. The motion compensation may be based on one or more motion vectors of the first reference picture 1502. The filtered signals may be combined at 1516 using a linear combination, e.g., addition or weighted addition to generate the predictor 1506.

The predictor 1506 may be a third reference picture, e.g., an EILR picture. The predictor 1506 may be used to predict pixel values of a video frame, e.g., in a hybrid DCT-based video codec.

The coefficients of the low pass filter 1508 and/or the high pass filter 1512 may be encoded into the video bitstream. The low pass filter 1508 and/or the high pass filter 1512 may be implemented as an all-pass filter, e.g., no filtering may be performed on the base layer data and/or the enhancement layer data.

The processes and instrumentalities described herein may apply in any combination, may apply to other wireless technology, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A video coding method comprising:
receiving a first reference picture and a second reference picture;
performing motion compensation on a plurality of pixel values of the first reference picture, based on motion information associated with the second reference picture, to generate a plurality of motion compensated pixel values;
applying a high pass filter on the plurality of motion compensated pixel values to generate high frequency information;
applying a low pass filter on a third reference picture to generate low frequency information; and
generating a predictor based on a combination of the high frequency information and the low frequency information.

2. The video coding method of claim 1, further comprising generating a current picture using the predictor as a reference picture.

3. The video coding method of claim 2, wherein the current picture comprises an enhancement layer picture.

4. The video coding method of claim 1, wherein the first reference picture and the second reference picture are from different layers.

5. The video coding method of claim 1, wherein the first reference picture comprises an enhancement layer reference picture.

6. The video coding method of claim 1, wherein the motion information associated with the second reference picture is upsampled, and the motion compensation is performed based on the upsampled motion information.

7. The video coding method of claim 1, wherein the second reference picture comprises a base layer reference picture.

8. The video coding method of claim 1, wherein the third reference picture is generated by upsampling the second reference picture.

9. The video coding method of claim 1, wherein the combination comprises at least one of addition or weighted addition.

10. The video coding method of claim 1, further comprising including a first plurality of filter coefficients associated with the high pass filter and a second plurality of filter coefficients associated with the low pass filter in a video bitstream.

11. The video coding method of claim 1, wherein at least one of the high pass filter or the low pass filter is an all-pass filter.

12. A video coding device comprising:
a memory configured to store processor-executable instructions; and
a processor configured to execute the processor-executable instructions, the processor configured to:
receive a first reference picture and a second reference picture;
perform motion compensation on a plurality of pixel values of the first reference picture, based on motion information associated with the second reference picture, to generate a plurality of motion compensated pixel values;
apply a high pass filter on the plurality of motion compensated pixel values to generate high frequency information;
apply a low pass filter on a third reference picture to generate low frequency information; and
generate a predictor based on a combination of the high frequency information and the low frequency information.

13. The video coding device of claim 12, wherein the processor is further configured to generate a current picture using the predictor as a reference picture.

14. The video coding device of claim 13, wherein the current picture comprises an enhancement layer picture.

15. The video coding device of claim 12, wherein the first reference picture and the second reference picture are from different layers.

16. The video coding device of claim 12, wherein the first reference picture comprises an enhancement layer reference picture.

17. The video coding device of claim 12, wherein the third reference picture is generated by upsampling the second reference picture.

18. The video coding device of claim 12, wherein the predictor comprises an enhanced inter-layer reference (EILR) picture.

19. The video coding method of claim 1, wherein the predictor comprises an enhanced inter-layer reference picture (EILR), the method further comprising encoding an enhancement layer picture using the EILR picture as a reference picture.

20. The video coding device of claim 12, wherein the combination comprises at least one of addition or weighted addition.

21. The video coding device of claim 12, wherein the processor is further configured to include a first plurality of filter coefficients associated with the high pass filter and a second plurality of filter coefficients associated with the low pass filter in a video bitstream.

22. The video coding device of claim 12, wherein at least one of the high pass filter or the low pass filter is an all-pass filter.

23. The video coding method of claim 1, wherein the third reference picture is an inter-layer reference picture.

24. The video coding method of claim 1, wherein the second reference picture and the third reference picture are the same.

25. The video coding device of claim 14, wherein the third reference picture is an inter-layer reference picture.

26. The video coding device of claim 14, wherein the second reference picture and the third reference picture are the same.

27. The video coding device of claim 14, wherein the motion information associated with the second reference picture is upsampled, and the motion compensation is performed based on the upsampled motion information.

28. The video coding device of claim 14, wherein the second reference picture comprises a base layer reference picture.

\* \* \* \* \*